United States Patent
Kitagawa et al.

(10) Patent No.: US 11,397,490 B2
(45) Date of Patent: Jul. 26, 2022

(54) LIQUID CRYSTAL DISPLAY DEVICE AND METHOD FOR DRIVING SAME

(71) Applicant: SHARP KABUSHIKI KAISHA, Sakai (JP)

(72) Inventors: Daiji Kitagawa, Sakai (JP); Noriyuki Tanaka, Sakai (JP); Jin Miyazawa, Sakai (JP); Yousuke Nakamura, Sakai (JP); Daisuke Suehiro, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/528,113

(22) Filed: Nov. 16, 2021

(65) Prior Publication Data
US 2022/0187974 A1 Jun. 16, 2022

Related U.S. Application Data

(60) Provisional application No. 63/123,844, filed on Dec. 10, 2020.

(51) Int. Cl.
*G06F 3/041* (2006.01)
*G09G 3/36* (2006.01)

(52) U.S. Cl.
CPC ........ *G06F 3/04166* (2019.05); *G06F 3/0412* (2013.01); *G09G 3/3677* (2013.01); *G09G 3/3688* (2013.01); *G09G 3/3696* (2013.01); *G09G 2300/0842* (2013.01)

(58) Field of Classification Search
CPC .............. G09G 3/3648; G09G 3/3659; G09G 2300/0465; G09G 2300/0852
See application file for complete search history.

(56) References Cited

U.S. PATENT DOCUMENTS

| | | |
|---|---|---|
| 2011/0210927 A1 | 9/2011 | Mizuhashi et al. |
| 2013/0021231 A1 | 1/2013 | Kawashima et al. |
| 2015/0097792 A1 | 4/2015 | Yoshida |
| 2016/0012789 A1 | 1/2016 | Miyazawa et al. |
| 2017/0115810 A1 | 4/2017 | Takano |
| 2017/0148370 A1* | 5/2017 | Nakamura ........... G09G 3/3648 |

(Continued)

FOREIGN PATENT DOCUMENTS

| JP | 2015-096935 A | 5/2015 |
|---|---|---|
| JP | 2017-083530 A | 5/2017 |

OTHER PUBLICATIONS

Co-pending letter regarding a related co-pending U.S. Appl. No. 17/528,107.

*Primary Examiner* — Van N Chow
(74) *Attorney, Agent, or Firm* — ScienBiziP, P.C.

(57) ABSTRACT

In a memory liquid crystal display including a liquid crystal panel with a built-in touch panel, a black voltage or a white voltage is provided to a pixel electrode in accordance with a value of binary data stored in a memory circuit, and a display voltage generation circuit changes voltage values of the black voltage and the white voltage in synchronization with a continuous pulse voltage for touch detection in a touch detection period so that an absolute value of a voltage between the pixel electrode and a common electrode is maintained at a constant magnitude in each pixel circuit throughout a period from a point in time immediately before the start of the touch detection period to a point in time immediately after the end of the touch detection period.

7 Claims, 32 Drawing Sheets

(56) References Cited

U.S. PATENT DOCUMENTS

| | | | |
|---|---|---|---|
| 2018/0004345 A1* | 1/2018 | Shin | G06F 3/0412 |
| 2019/0265835 A1* | 8/2019 | Shin | G06F 3/0418 |
| 2020/0135132 A1* | 4/2020 | Tanaka | G09G 3/3677 |
| 2021/0126017 A1* | 4/2021 | Furuta | H01L 27/124 |

* cited by examiner

LIQUID CRYSTAL DISPLAY DEVICE AND METHOD FOR DRIVING SAME

CROSS-REFERENCE TO RELATED APPLICATIONS

This application claims the benefit of priority to U.S. Provisional Application No. 63/123,844 filed on Dec. 10, 2020. The entire contents of the above-identified application are hereby incorporated by reference.

BACKGROUND

Technical Field

The following disclosure relates to a liquid crystal display device and particularly relates to a liquid crystal display device including a liquid crystal panel with a built-in touch panel.

A touch panel has attracted attention as an input device for performing operations in a computer system or the like in the related art. For example, in a capacitive touch panel, a position of an object to be detected such as a finger of a user (operator) or a touch pen is detected based on a change in electrostatic capacitance. Such a touch panel has been used by being superimposed on a display panel such as a liquid crystal panel in the related art. Such a touch panel provided on the display panel is referred to as an "out-cell type touch panel".

However, in the out-cell type touch panel, an increase in the weight and the thickness of the entire device including the display panel and the touch panel, and an increase in the power required to drive the touch panel have been problems. Thus, in recent years, development of display devices having a configuration in which the display panel and the touch panel are integrated has advanced. The touch panels having the configuration integrated with the display panel mainly include those referred to as "on-cell type touch panels" and those referred to as "in-cell type touch panels". In the on-cell type touch panels, a sensor electrode is provided between one of two glass substrates constituting the display panel and a polarizer. In the in-cell type touch panels, the sensor electrode is provided inside the two glass substrates.

As described above, the touch panels include several types, but in recent years, the in-cell type touch panels have become mainstream in the market. In the in-cell type touch panels, rectangular sensor electrodes segmented into a plurality of rows×a plurality of columns are typically used, and touch detection (detection of touch position on the touch panel) is performed by a self capacitance method. Note that the self capacitance method is a method for measuring a position of an object to be detected by detecting that electrostatic capacitance has increased due to contact or approach of the object to be detected with or to the touch panel.

Some in-cell type touch panels employ a configuration in which the sensor electrode described above and a common electrode which is an electrode used for displaying an image are shared. In such a configuration, one electrode is used as the sensor electrode for performing the touch detection, and is also used as the common electrode for image display. By sharing the sensor electrode and the common electrode in this manner, a reduction in thickness and weight of the device are realized.

In recent years, liquid crystal display devices provided with memory circuits in pixel circuits have been developed in order to reduce power consumption. Such a liquid crystal display device is referred to as a "memory liquid crystal display". In general, in the memory liquid crystal display, one bit of data can be held for each pixel, and in a case where an image of the same content or an image with a small change is displayed for a long period of time, image display using the data held in the memory circuit is performed. In the memory liquid crystal display, once the data is written to the memory circuit, the contents of the data written to the memory circuit are held until the next rewrite. Thus, little power is consumed in periods other than the periods before and after the contents of the image change. Thus, low power consumption can be achieved.

FIG. 28 is a diagram illustrating a configuration of a pixel circuit 900 of a known memory liquid crystal display. As illustrated in FIG. 28, the pixel circuit 900 includes an input switch 910, a memory circuit 920, a voltage selection circuit 930, and a liquid crystal capacitance 940 constituted by a pixel electrode 941 and a common electrode 942. A first scanning signal GLA, a second scanning signal GLB, a data signal SL, a black voltage VA, which is a voltage for black display, and a white voltage VB, which is a voltage for white display, are supplied to the pixel circuit 900.

A state of the input switch 910 is controlled by the first scanning signal GLA and the second scanning signal GLB. When the input switch 910 is in an on state, the data signal SL is supplied to the memory circuit 920. Note that the data signal SL is binary data. The memory circuit 920 stores the binary data based on the data signal SL. The voltage selection circuit 930 selects either the black voltage VA or the white voltage VB in accordance with a value of the binary data stored in the memory circuit 920. The voltage selected by the voltage selection circuit 930 is then applied to the pixel electrode 941, which is reflected in a display state of the pixel.

Note that, in connection with the present case, JP 2015-96935 A and JP 2017-83530 A disclose technologies related to a memory liquid crystal display provided with a touch panel.

However, the memory liquid crystal display provided with the in-cell type touch panel is not realized for the reasons below. Note that in the following, a common electrode voltage is denoted by a reference sign VCOM, and a pixel electrode voltage is denoted by a reference sign Vp. In the following, focusing on a normally-white type, it is assumed that a liquid crystal application voltage is 0 V when the white display is performed, and the liquid crystal application voltage is 5 V or −5 V when the black display is performed.

FIG. 29 is a waveform diagram when the black display is performed by a known memory liquid crystal display (by one pixel of interest). For the common electrode voltage VCOM, 5 V and 0 V appear alternately. Specifically, the common electrode voltage VCOM is 5 V in a period in which the black voltage VA is 0 V, and the common electrode voltage VCOM is 0 V in a period in which the black voltage VA is 5 V. By selecting the black voltage VA by the voltage selection circuit 930, the pixel electrode voltage Vp is equal to the black voltage VA. As described above, the liquid crystal application voltage is −5 V in a period in which the common electrode voltage VCOM is 5 V, and the liquid crystal application voltage is 5 V in a period in which the common electrode voltage VCOM is 0 V. As a result, the black display is performed.

FIG. 30 is a waveform diagram when the black display is performed, assuming that the known memory liquid crystal display is provided with the in-cell type touch panel. Note that a touch detection period (a period for detecting a touched position on the touch panel) is denoted by a reference sign Td. A pulse signal for touch detection is supplied to the common electrode 942 in the touch detection period Td. Accordingly, in the touch detection period Td, as illustrated in FIG. 30, the common electrode voltage VCOM varies between 0 V and 5 V. Here, in a period in which the common electrode voltage VCOM is 0 V among periods T91 and T93 in which the common electrode voltage VCOM is supposed to be maintained at 5 V, the common electrode voltage VCOM and the pixel electrode voltage Vp are equal to each other, so the liquid crystal application voltage is 0 V. In addition, in a period in which the common electrode voltage VCOM is 5 V among periods T92 and T94 in which the common electrode voltage VCOM is supposed to be maintained at 0 V, the common electrode voltage VCOM and the pixel electrode voltage Vp are also equal to each other, so the liquid crystal application voltage is 0 V. In this way, the white display is inserted in the period in which the black display is supposed to be performed.

FIG. 31 is a waveform diagram when the white display is performed by the known memory liquid crystal display. For the common electrode voltage VCOM, 5 V and 0 V appear alternately. Specifically, the common electrode voltage VCOM is 5 V in a period in which the white voltage VB is 5 V, and the common electrode voltage VCOM is 0 V in a period in which the white voltage VB is 0 V. By selecting the white voltage VB in the voltage selection circuit 930, the pixel electrode voltage Vp is equal to the white voltage VB. As described above, the liquid crystal application voltage is 0 V both in the period in which the common electrode voltage VCOM is 5 V and in the period in which the common electrode voltage VCOM is 0 V. As a result, the white display is performed.

FIG. 32 is a waveform diagram when the white display is performed, assuming that the known memory liquid crystal display is provided with the in-cell type touch panel. Similar to the example illustrated in FIG. 30, in the touch detection period Td, as illustrated in FIG. 32, the common electrode voltage VCOM varies between 0 V and 5 V. Here, in a period in which the common electrode voltage VCOM is 0 V among periods T95 and T97 in which the common electrode voltage VCOM is supposed to be maintained at 5 V, the pixel electrode voltage Vp is maintained at 5 V, so the liquid crystal application voltage is 5 V. In addition, in a period in which the common electrode voltage VCOM is 5 V among periods T96 and T98 in which the common electrode voltage VCOM is supposed to be maintained at 0 V, the pixel electrode voltage Vp is maintained at 0 V, so the liquid crystal application voltage is −5 V. In this way, the black display is inserted in the period in which the white display is supposed to be performed.

As described above, in the case where the in-cell type touch panel is provided in the known memory liquid crystal display, a display defect (inversion of black and white) occurs due to the pulse signal for touch detection being supplied to the common electrode 942.

SUMMARY

Thus, the following disclosure is directed to realizing the memory liquid crystal display provided with the in-cell type touch panel.

(1) A liquid crystal display device according to some embodiments of the disclosure is a liquid crystal display device including a liquid crystal panel with a built-in touch panel, the liquid crystal display device including a display voltage generation circuit configured to generate a first voltage and a second voltage, a plurality of pixel circuits each including a liquid crystal capacitance constituted by a pixel electrode and a common electrode, a memory circuit configured to store binary data, and a voltage selection circuit configured to supply either the first voltage or the second voltage to the pixel electrode in accordance with a value of the binary data stored in the memory circuit; and a common electrode drive circuit configured to change a voltage value of a voltage applied to the common electrode between a high-level voltage value and a low-level voltage value, wherein the touch panel uses the common electrode as an electrode for touch detection, the common electrode drive circuit applies a continuous pulse voltage for touch detection changing between the high-level voltage value and the low-level voltage value to the common electrode in a touch detection period for detecting a touched position on the touch panel, and the display voltage generation circuit changes a voltage value of each of the first voltage and the second voltage between the high-level voltage value and the low-level voltage value inversely with each other in periods other than the touch detection period and changes the voltage value of each of the first voltage and the second voltage in synchronization with the continuous pulse voltage in the touch detection period to maintain an absolute value of a voltage between the pixel electrode and the common electrode at a constant magnitude in each of the plurality of pixel circuits throughout a period from a point in time immediately before a start of the touch detection period to a point in time immediately after an end of the touch detection period.

According to such a configuration, in the memory liquid crystal display provided with the in-cell type touch panel (the liquid crystal display device provided with the memory circuit in the pixel circuit) that uses the common electrode as an electrode for touch detection, the display voltage generation circuit changes the voltage values of the first voltage (for example, the voltage for black display) and the second voltage (for example, the voltage for white display) in synchronization with the continuous pulse voltage for touch detection in the touch detection period. As a result, for example, in the touch detection period, the voltage value of the first voltage changes inversely with the voltage value of the common electrode voltage, and the voltage value of the second voltage changes similarly to the voltage value of the common electrode voltage. As a result, in the touch detection period, in a pixel in which display based on the first voltage is supposed to be performed, the voltage value of the pixel electrode voltage changes inversely with the voltage value of the common electrode voltage, and in a pixel in which display based on the second voltage is supposed to be performed, the voltage value of the pixel electrode voltage changes similarly to the voltage value of the common electrode voltage. Thus, the liquid crystal application voltage is maintained at the desired voltage throughout the touch detection period. Thus, the display defect (inversion of black and white) due to the continuous pulse voltage for touch detection being supplied to the common electrode does not occur. As described above, the memory liquid crystal display provided with the in-cell type touch panel is realized.

(2) The liquid crystal display device according to some embodiments of the disclosure includes the above-described configuration (1), wherein the display voltage generation circuit changes the voltage value of the first voltage inversely with the voltage value of the voltage applied to the common electrode and changes the voltage value of the second voltage similarly to the voltage value of the voltage applied to the common electrode both in the periods other than the touch detection period and in the touch detection period.

(3) The liquid crystal display device according to some embodiments of the disclosure includes the above-described configuration (1), wherein the display voltage generation circuit changes the voltage value of the first voltage inversely with the voltage value of the voltage applied to the common electrode, in the periods other than the touch detection period, increases the voltage value of the first voltage by a difference value between the high-level voltage value and the low-level voltage value when a voltage value of the continuous pulse voltage increases and decreases the voltage value of the first voltage by the difference value between the high-level voltage value and the low-level voltage value when the voltage value of the continuous pulse voltage decreases, in the touch detection period, and changes the voltage value of the second voltage similarly to the voltage value of the voltage applied to the common electrode, both in the periods other than the touch detection period and in the touch detection period.

(4) The liquid crystal display device according to some embodiments of the disclosure includes the above-described configuration (1), wherein the display voltage generation circuit changes the voltage value of the first voltage inversely with the voltage value of the voltage applied to the common electrode, in the periods other than the touch detection period, changes the voltage value of the first voltage inversely with the voltage value of the voltage applied to the common electrode when a voltage value of the continuous pulse voltage first changes and when the voltage value of the continuous pulse voltage last changes, in the touch detection period started in a period in which the voltage value of the voltage applied to the common electrode is maintained at the high-level voltage value, increases the voltage value of the first voltage by a difference value between the high-level voltage value and the low-level voltage value when the voltage value of the continuous pulse voltage increases and decreases the voltage value of the first voltage by the difference value between the high-level voltage value and the low-level voltage value when the voltage value of the continuous pulse voltage decreases, in a period from a point in time immediately after the voltage value of the continuous pulse voltage first changes to a point in time immediately before the voltage value of the continuous pulse voltage last changes, in the touch detection period started in the period in which the voltage value of the voltage applied to the common electrode is maintained at the high-level voltage value, increases the voltage value of the first voltage by the difference value between the high-level voltage value and the low-level voltage value when the voltage value of the continuous pulse voltage increases and decreases the voltage value of the first voltage by the difference value between the high-level voltage value and the low-level voltage value when the voltage value of the continuous pulse voltage decreases, in the touch detection period started in a period in which the voltage value of the voltage applied to the common electrode is maintained at the low-level voltage value, and changes the voltage value of the second voltage similarly to the voltage value of the voltage applied to the common electrode, both in the periods other than the touch detection period and in the touch detection period.

(5) The liquid crystal display device according to some embodiments of the disclosure includes the above-described configuration (4), wherein each time one touch detection period is provided in a first drive period in which the voltage value of the voltage applied to the common electrode is supposed to be maintained at the high-level voltage value, one touch detection period is provided in a second drive period in which the voltage value of the voltage applied to the common electrode is supposed to be maintained at the low-level voltage value, and the following equation is established: $Ta-Tb=2\times Tz$, where Ta is a length of periods other than the touch detection period in the first drive period in which the touch detection period is provided, Tb is a length of periods other than the touch detection period in the second drive period in which the touch detection period is provided, and Tz is a length of a period from a point in time when the voltage value of the continuous pulse voltage first changes to a point in time when the voltage value of the continuous pulse voltage last changes in the touch detection period started in the first drive period.

(6) A liquid crystal display device according to some embodiments of the disclosure includes, in addition to the above-described any one of configurations (1) to (5), a plurality of scanning signal lines configured to supply a scanning signal to each of the plurality of pixel circuits; a scanning signal line drive circuit configured to apply the scanning signal to each of the plurality of scanning signal lines; a plurality of data signal lines configured to supply a data signal to each of the plurality of pixel circuits; a data signal line drive circuit configured to apply the data signal to each of the plurality of data signal lines; a scanning signal supply control switch circuit provided in a region outside a display region where the plurality of pixel circuits are formed, the scanning signal supply control switch circuit being configured to control an electrical connection state between the scanning signal line drive circuit and the plurality of scanning signal lines in the display region; and a data signal supply control switch circuit provided in the region outside the display region, the data signal supply control switch circuit being configured to control an electrical connection state between the data signal line drive circuit and the plurality of data signal lines in the display region, wherein the scanning signal supply control switch circuit electrically disconnects the scanning signal line drive circuit and the plurality of scanning signal lines in the display region from each other before the start of the touch detection period and electrically connects the scanning signal line drive circuit and the plurality of scanning signal lines in the display region to each other after the end of the touch detection period, and the data signal supply control switch circuit electrically disconnects the data signal line drive circuit and the plurality of data signal lines in the display region from each other before the start of the touch detection period and electrically connects the data signal line drive circuit and the plurality of data signal lines in the display region to each other after the end of the touch detection period.

(7) A method for driving a liquid crystal display device according to some embodiments of the disclosure is a method for driving a liquid crystal display device including a liquid crystal panel with a built-in touch panel, the liquid crystal display device including a display voltage generation circuit configured to generate a first voltage and a second voltage, a plurality of pixel circuits each including a liquid crystal capacitance constituted by a pixel electrode and a common electrode, a memory circuit configured to store binary data, and a voltage selection circuit configured to supply either the first voltage or the second voltage to the pixel electrode in accordance with a value of the binary data stored in the memory circuit, and a common electrode drive circuit configured to change a voltage value of a voltage applied to the common electrode between a high-level voltage value and a low-level voltage value, and the touch panel using the common electrode as an electrode for touch detection, the method comprising: a touch detection step of applying, by the common electrode drive circuit, a continuous pulse voltage for touch detection changing between the high-level voltage value and the low-level voltage value to the common electrode to detect a touched position on the touch panel, wherein the display voltage generation circuit changes a voltage value of each of the first voltage and the second voltage between the high-level voltage value and the low-level voltage value inversely with each other in periods other than a period in which the continuous pulse voltage is applied to the common electrode, and in the touch detection step, the display voltage generation circuit changes the voltage value of each of the first voltage and the second voltage in synchronization with the continuous pulse voltage to maintain an absolute value of a voltage between the pixel electrode and the common electrode at a constant magnitude in each of the plurality of pixel circuits throughout a period from a point in time immediately before a start of an application of the continuous pulse voltage to the common electrode to a point in time immediately after an end of the application of the continuous pulse voltage to the common electrode.

These and other objects, features, aspects, and advantages of the disclosure will become more apparent from the following detailed description of the disclosure with reference to the accompanying drawings.

BRIEF DESCRIPTION OF DRAWINGS

The disclosure will be described with reference to the accompanying drawings, wherein like numbers reference like elements.

DESCRIPTION OF EMBODIMENTS

Embodiments will be described below with reference to the accompanying drawings. A liquid crystal display device described in each of the following embodiments is above-described memory liquid crystal display. and includes the in-cell type touch panel.

1. First Embodiment

1.1 Overall Configuration and Schematic Operation

Figure 2:
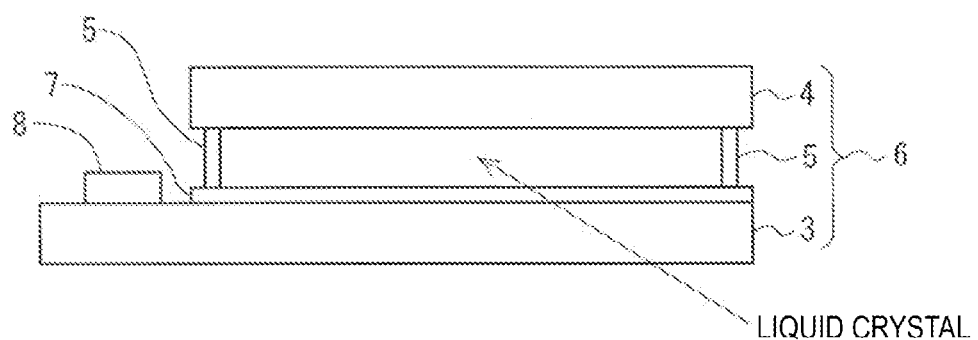
FIG. 2 is a schematic side view of a liquid crystal display device according the first embodiment.

An overall configuration and a schematic operation of the liquid crystal display device according to the first embodiment will be described with reference to FIGS. 2 to 6. FIG. 2 is a schematic side view of the liquid crystal display device according the present embodiment. In the present embodiment, a liquid crystal panel 6 is constituted of a TFT array substrate 3 and a color filter substrate 4, which are two glass substrates provided to face each other with a liquid crystal interposed therebetween. The TFT array substrate 3 and the color filter substrate 4 are bonded together by, for example, a sealing member 5. A touch panel 7 is built in the liquid crystal panel 6. In other words, the touch panel 7 in the present embodiment is the in-cell type touch panel. An IC 8, referred to as a Touch and Display Driver Integration (TDDI), is provided in a so-called frame region on the TFT array substrate 3. The IC 8 has a function of controlling image display and a function of controlling touch detection.

In the present embodiment, a common electrode, which is an electrode for image display, is also used as an electrode for touch detection. By sharing the electrode for touch detection and the electrode for image display in this manner, a reduction in thickness and weight of the device is realized.

In the present embodiment, both of the pixel electrode and the common electrode are provided on the TFT array substrate 3. In other words, the IPS mode is employed as the liquid crystal operating mode. However, no such limitation is intended.

Figure 3:
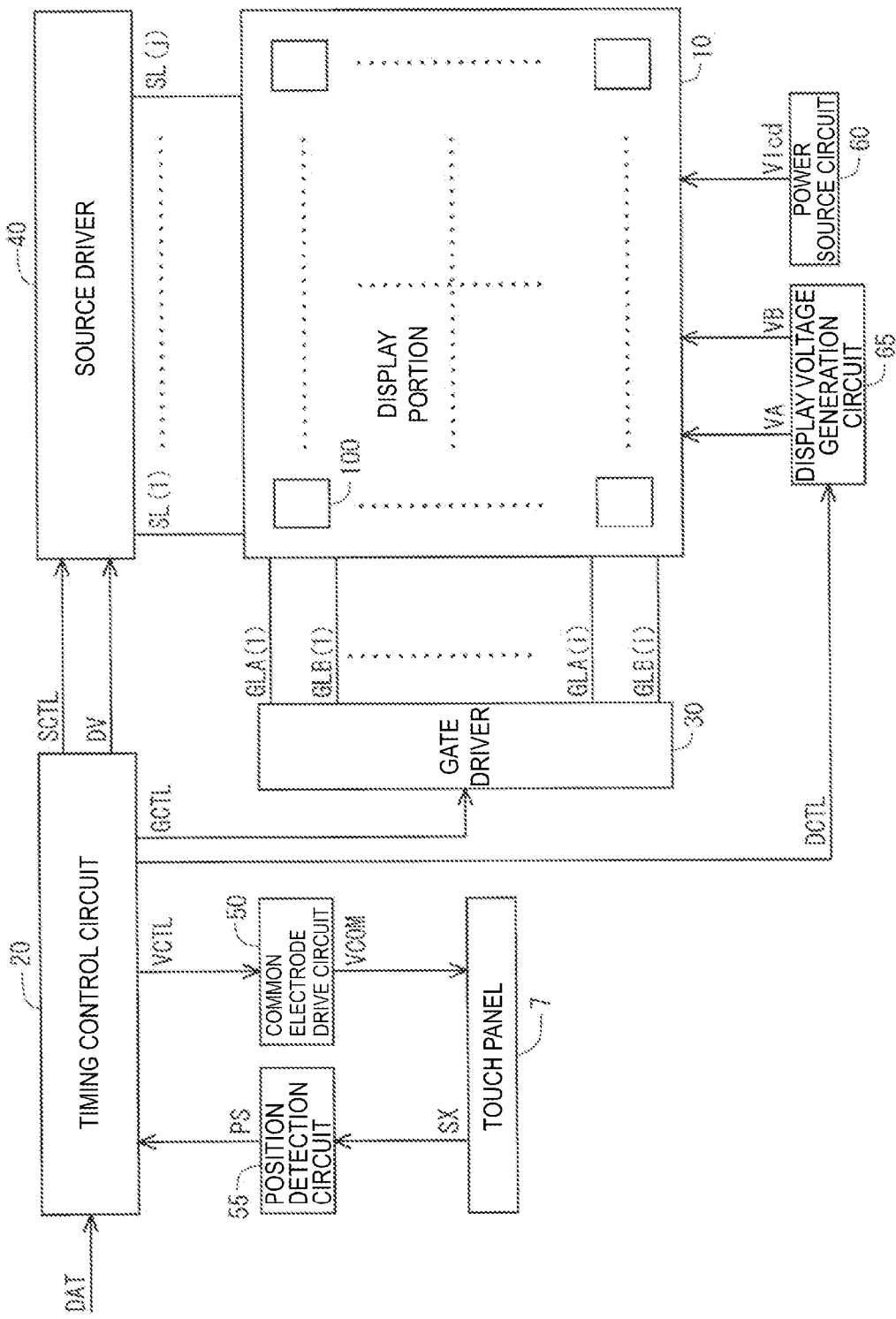
FIG. 3 is a block diagram for describing a functional configuration of the liquid crystal display device according to the first embodiment.

FIG. 3 is a block diagram for describing a functional configuration of the liquid crystal display device according to the present embodiment. As illustrated in FIG. 3, the liquid crystal display device includes a display portion 10, the touch panel 7 a timing control circuit 20, a gate driver (scanning signal line drive circuit) 30, a source driver (data signal line drive circuit) 40, a common electrode drive circuit 50, a position detection circuit 55, a power source circuit 60, and a display voltage generation circuit 65. The display portion (display region) 10 includes (i×j) pixel circuits 100. The touch panel 7 is constituted by the common electrode. Note that the timing control circuit 20, the source driver 40, the common electrode drive circuit 50, the position detection circuit 55, the power source circuit 60, and the display voltage generation circuit 65 are provided in the above-described IC 8 (see FIG. 2).

Figure 4:
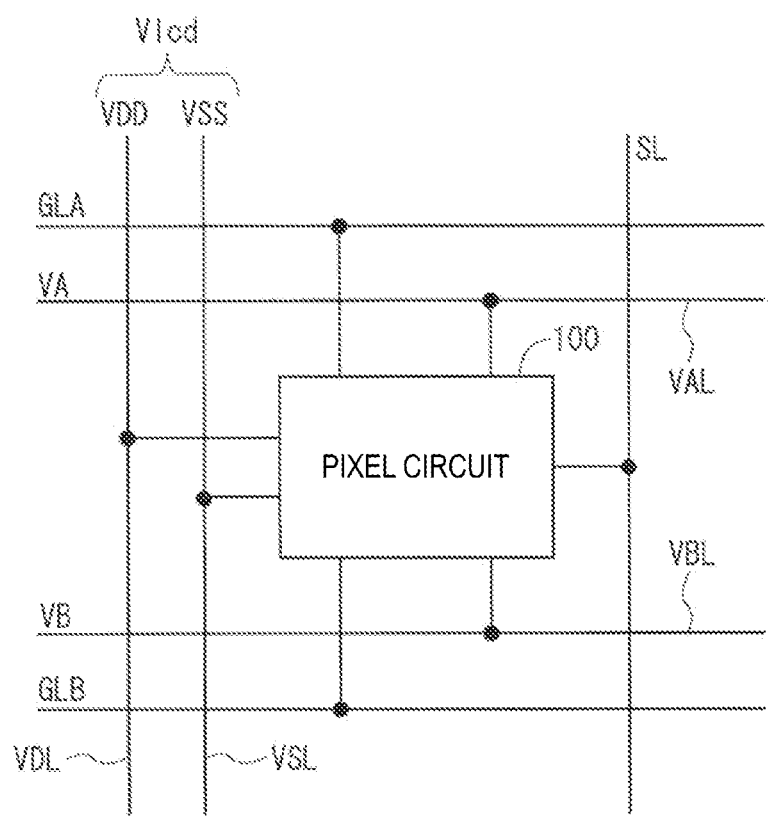
FIG. 4 is a diagram for describing various wiring lines arranged around the pixel circuit according to the first embodiment.

Various wiring lines are arranged around each pixel circuit 100 as illustrated in FIG. 4. Specifically, each pixel circuit 100 is connected to a first gate bus line configured to supply a first scanning signal GLA, a second gate bus line configured to supply a second scanning signal GLB, a source bus line configured to supply a data signal SL, a black voltage supply line VAL configured to supply the black voltage VA, a white voltage supply line VBL configured to supply the white voltage VB, a high-level voltage supply line VDL configured to supply a high-level DC power supply voltage VDD, and a low-level voltage supply line VSL configured to supply a low-level DC power supply voltage VSS. Accordingly, a plurality of the first gate bus lines, a plurality of the second gate bus lines, a plurality of the source bus lines, a plurality of the black voltage supply lines VAL, a plurality of the white voltage supply lines VBL, a plurality of the high-level voltage supply lines VDL, and a plurality of the low-level voltage supply lines VSL are arranged in the display portion 10. Note that the first gate bus line and the second gate bus line correspond to a scanning signal line, the source bus line corresponds to a data signal line, the black voltage VA corresponds to a first voltage, and the white voltage VB corresponds to a second voltage.

The timing control circuit 20 receives image data DAT transmitted from an external host or the like and outputs a digital video signal DV, a gate control signal GCTL for controlling an operation of the gate driver 30, a source control signal SCTL for controlling an operation of the source driver 40, a common electrode control signal VCTL for controlling an operation of the common electrode drive circuit 50 and a display voltage control signal DCTL for controlling voltage values of the black voltage VA and the white voltage VB. The gate control signal GCTL includes a gate start pulse signal, a gate clock signal, and the like. The source control signal SCTL includes a source start pulse signal, a source clock signal, a latch strobe signal, and the like.

The gate driver 30 applies the first scanning signals GLA(1) to GLA(i) to the i first gate bus lines, and applies the second scanning signals GLB(1) to GLB(i) to the i second gate bus lines, based on the gate control signal GCTL transmitted from the timing control circuit 20. The source driver 40 applies data signals SL(1) to SL(j) to the j source bus lines, based on the digital video signal DV and the source control signal SCTL transmitted from the timing control circuit 20. The common electrode drive circuit 50 applies the common electrode voltage VCOM to the common electrode constituting the touch panel 7 based on the common electrode control signal VCTL transmitted from the timing control circuit 20. Note that a continuous pulse voltage for touch detection is applied to the common electrode in the touch detection period. The position detection circuit 55 receives the detection signal SX as a result of the touch detection, and supplies a position signal PS indicating a touch position to the timing control circuit 20. As a result, in the liquid crystal display device, image display in accordance with the touch position is performed.

Figure 5:
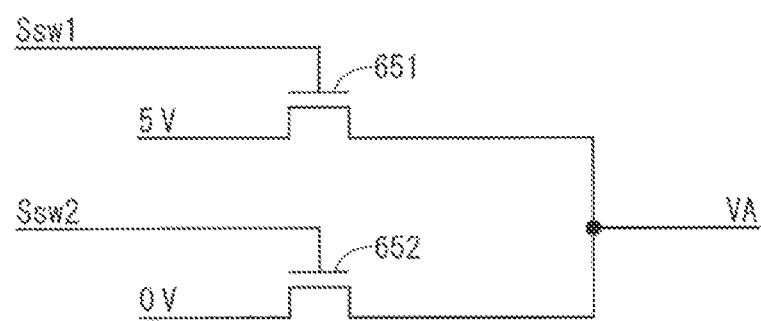
FIG. 5 is a circuit diagram illustrating a configuration example of a black voltage generation circuit in the first embodiment.

The power source circuit 60 outputs a power supply voltage Vlcd (high-level DC power supply voltage VDD and low-level DC power supply voltage VSS) for holding data in the memory circuit in the pixel circuit 100. The display voltage generation circuit 65 generates and outputs the black voltage VA and the white voltage VB. The display voltage control signal DCTL output from the timing control circuit 20 is supplied to the display voltage generation circuit 65. Based on the display voltage control signal DCTL, the voltage values of the black voltage VA and the white voltage VB output from the display voltage generation circuit 65 change in synchronization with the change in the voltage value of the common electrode voltage VCOM. A configuration example of a portion that generates the black voltage VA (hereinafter referred to as a "black voltage generation circuit") of the display voltage generation circuit 65 is illustrated in FIG. 5. Note that since a configuration of a portion that generates the white voltage VB (hereinafter referred to as a "white voltage generation circuit") of the display voltage generation circuit 65 is the same as the configuration of the black voltage generation circuit, a description thereof will be omitted. As illustrated in FIG. 5, the black voltage generation circuit is configured of a transistor 651 whose state is controlled by a control signal Ssw1 and a transistor 652 whose state is controlled by a control signal Ssw2 (the control signal Ssw1 and the control signal Ssw2 correspond to the display voltage control signal DCTL). When a voltage of 5 V is supposed to be output as the black voltage VA, only the transistor 651 is in the on state, and when a voltage of 0 V is supposed to be output as the black voltage VA, only the transistor 652 is in the on state. Note that although the transistors 651 and 652 functioning as switches are illustrated as n-channel transistors in FIG. 5, each transistor functioning as a switch may be realized by, for example, a p-channel transistor or a CMOS transistor (the same applies to FIGS. 11, 25 and 27).

Figure 6:
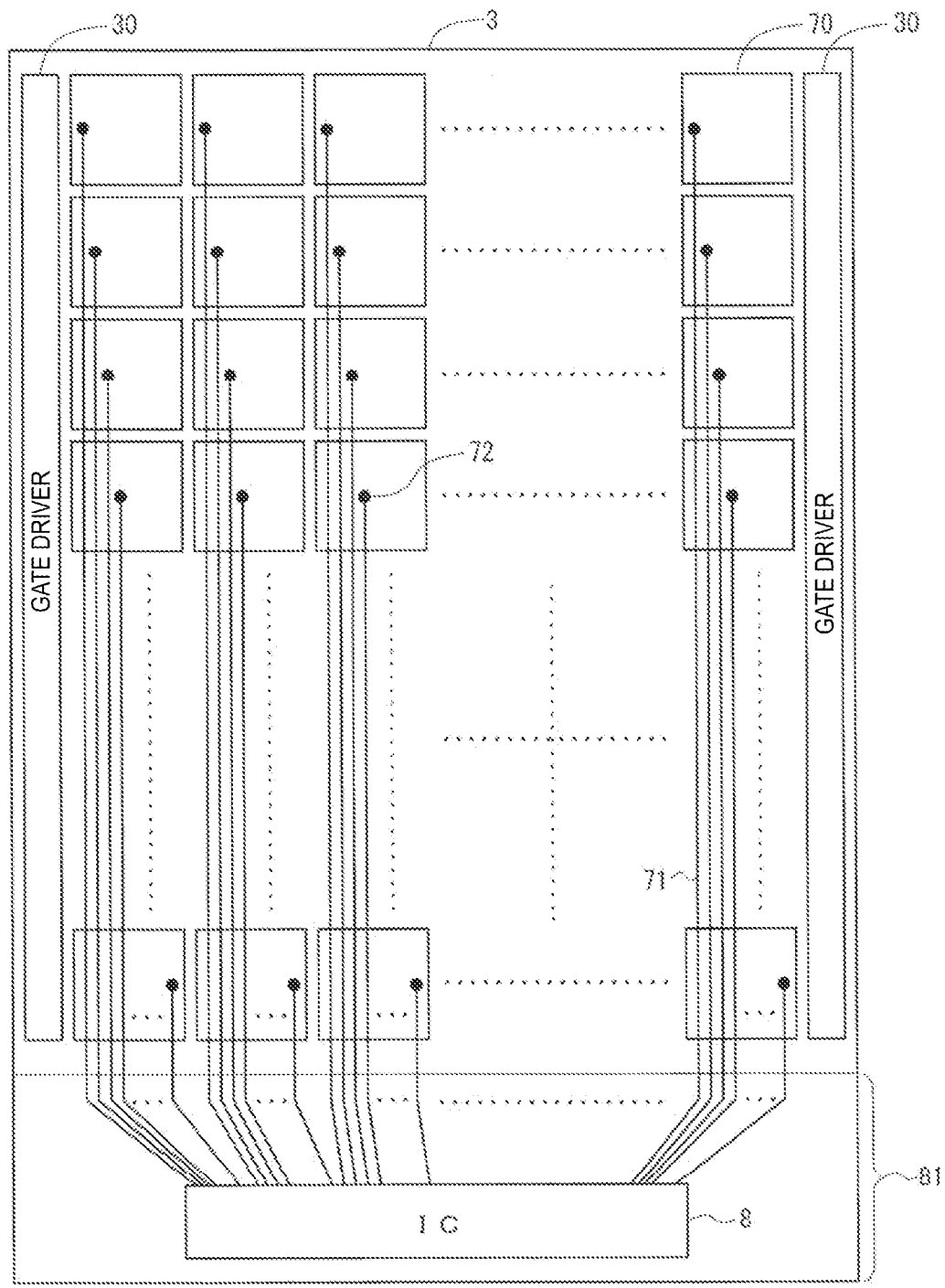
FIG. 6 is a schematic plan view illustrating a schematic configuration for touch detection in the first embodiment.

FIG. 6 is a plan view illustrating a schematic configuration for the touch detection. As described above, the liquid crystal panel 6 is constituted by the TFT array substrate 3 and the color filter substrate 4, which are two glass substrates provided to face each other with the liquid crystal interposed therebetween. Components for the touch detection are provided on the TFT array substrate 3 of the two glass substrates. Specifically, a common electrode 70, a common electrode wiring line 71, and the IC 8 are provided on the TFT array substrate 3. A contact portion 72 for connecting the common electrode 70 and the common electrode wiring line 71 to each other is provided on the TFT array substrate 3. Note that the IC 8 is provided in a frame region 81.

The common electrode 70 is realized by a transparent conductive film such as Indium Tin Oxide (ITO). As illustrated in FIG. 6, the common electrode 70 is divided into rectangular pads having a plurality of rows×a plurality of columns (for example, 32 rows×18 columns). In the present embodiment, the common electrode (each pad) 70 divided in this manner is used as an electrode for touch detection. In this regard, one pad is a minimum unit for detecting a position. Note that the number of divisions of the common electrode 70 is not particularly limited, and may be divided in accordance with a target resolution.

One end of the common electrode wiring line 71 is connected to the contact portion 72 formed on the corresponding common electrode 70, and the other end of the common electrode wiring line 71 is connected to the IC 8. As a result, the common electrode voltage VCOM is supplied to each common electrode 70 from the IC 8, and the touch position can be identified based on the detection signal SX.

1.2 Pixel Circuit

Figure 7:
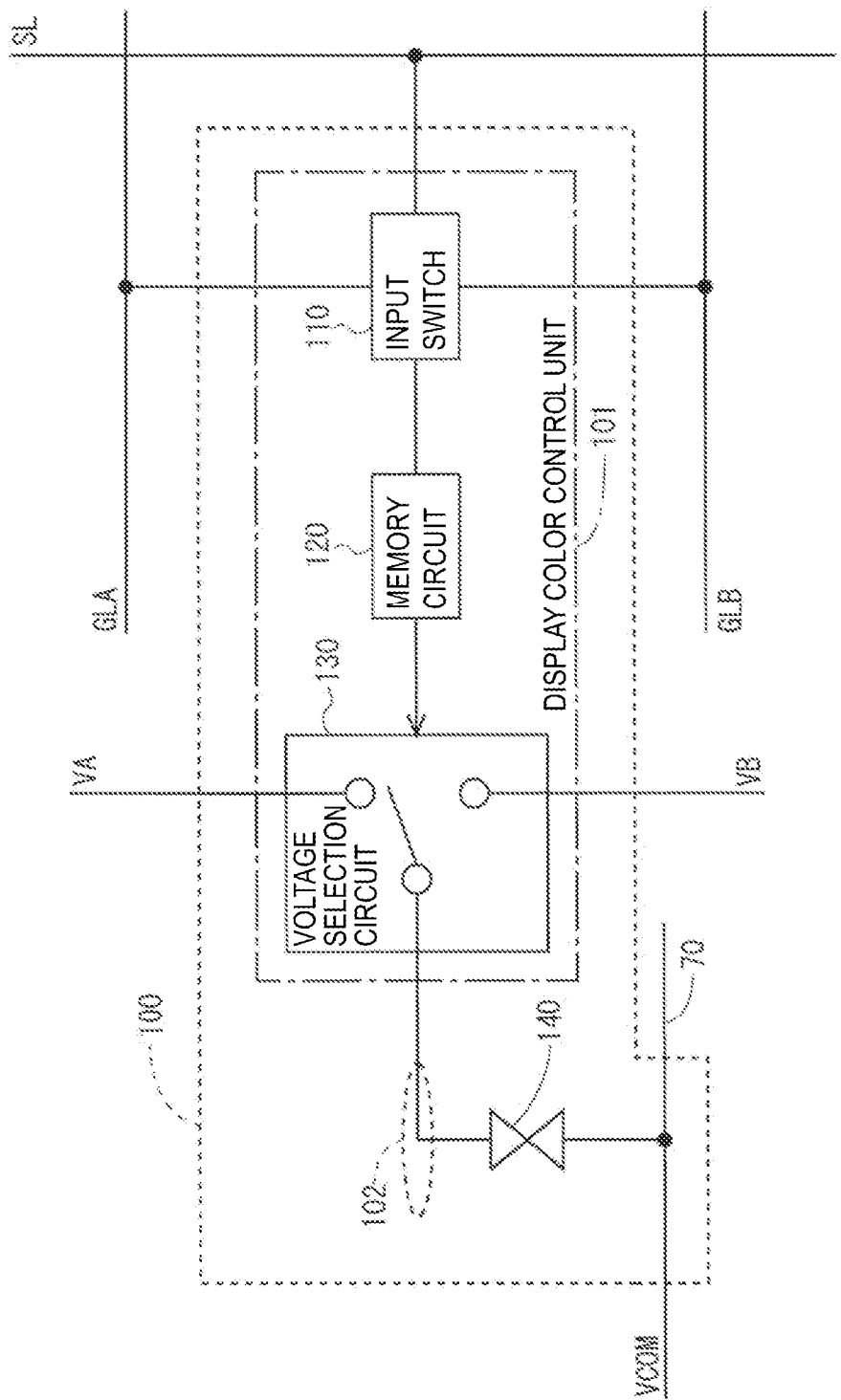
FIG. 7 is a diagram illustrating a configuration of the pixel circuit in the first embodiment.
Figure 28:
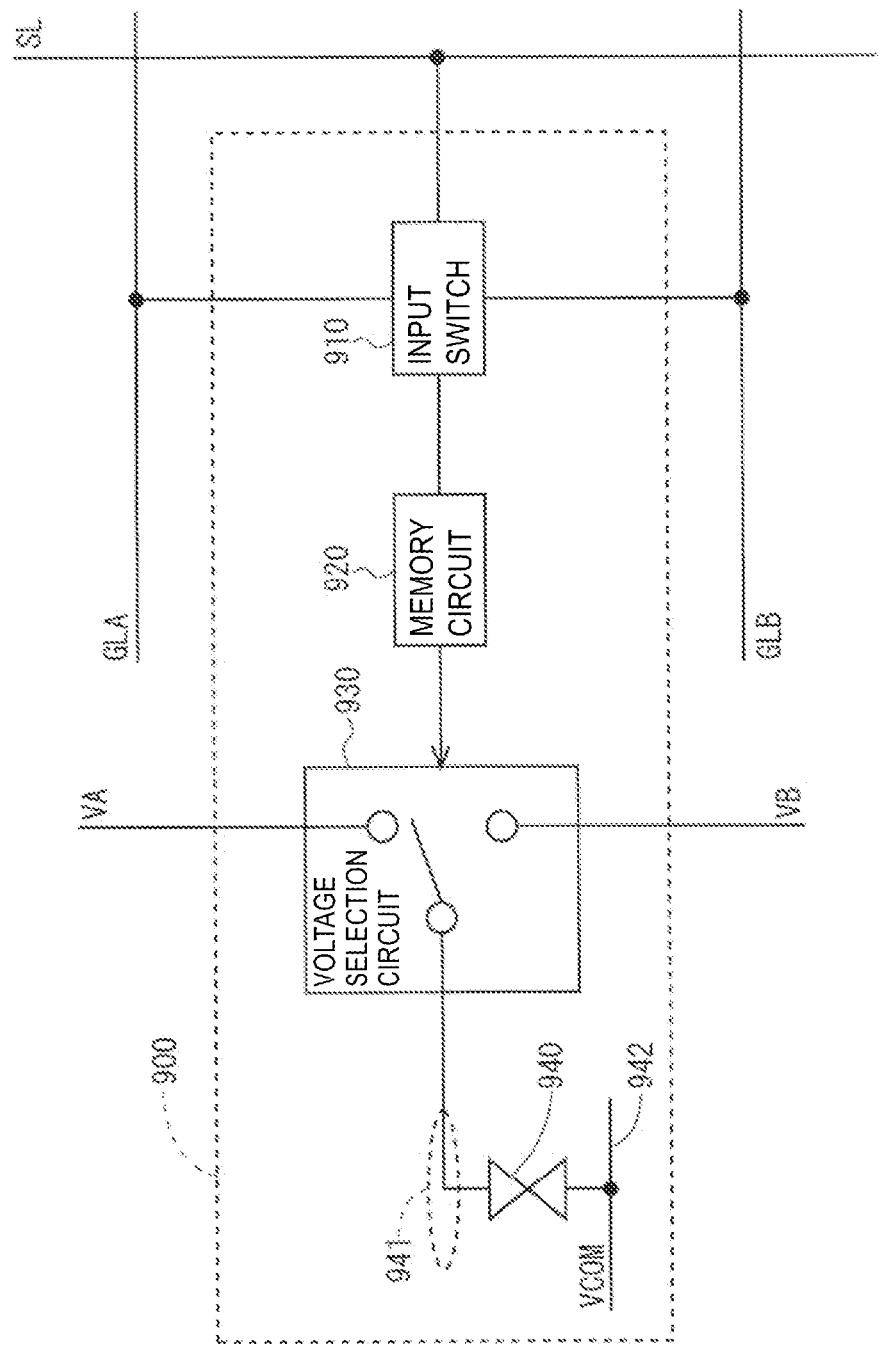
FIG. 28 is a diagram illustrating a configuration of a pixel circuit of a known memory liquid crystal display.
Figure 29:
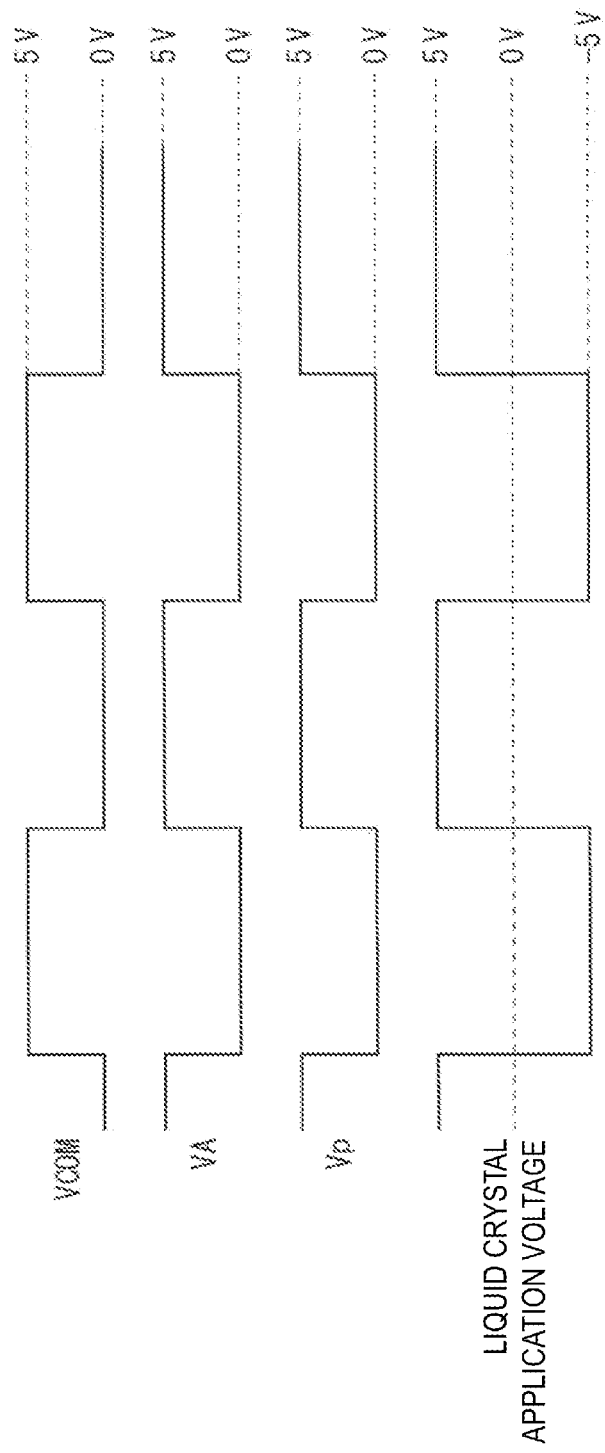
FIG. 29 is a waveform diagram when the black display is performed by the known memory liquid crystal display.
Figure 30:
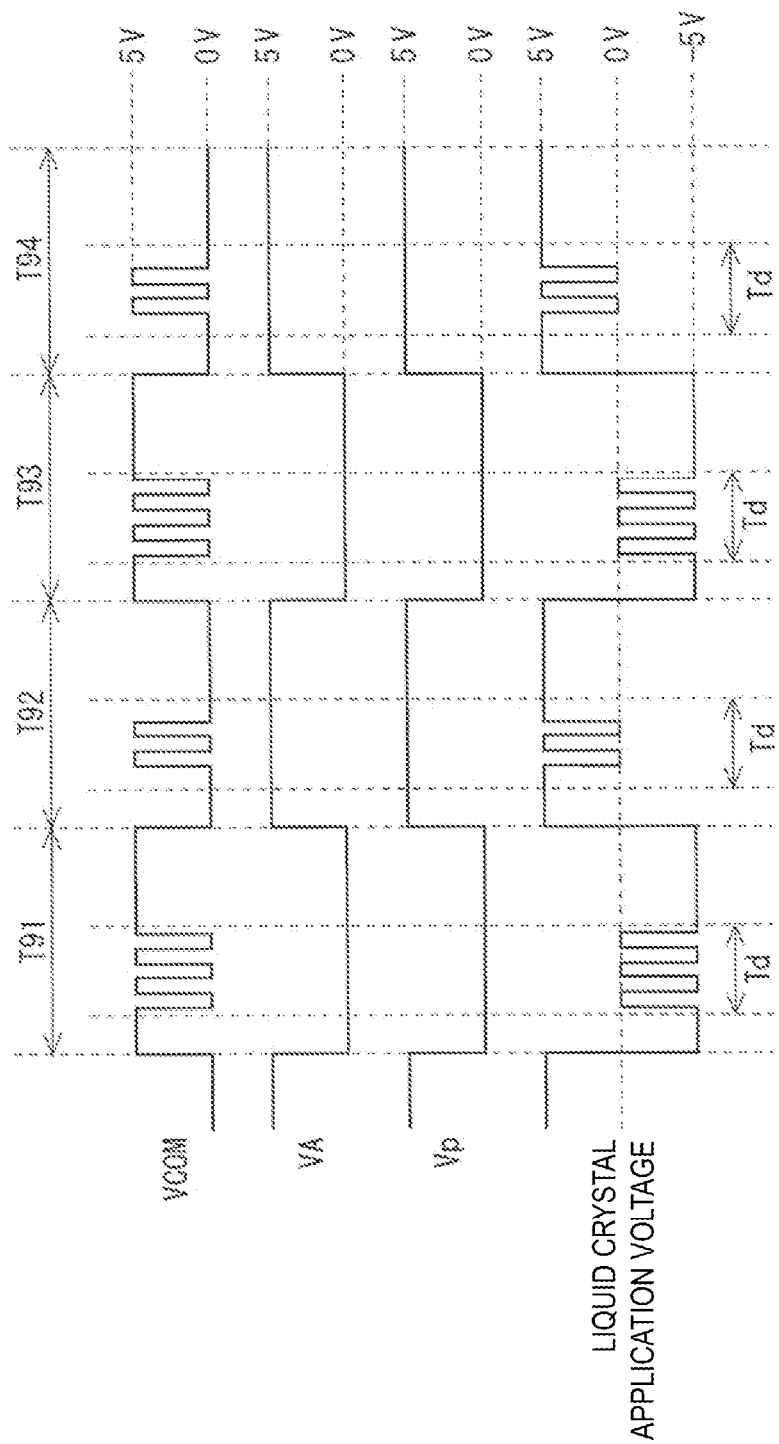
FIG. 30 is a waveform diagram when the black display is performed, assuming that the known memory liquid crystal display is provided with the in-cell type touch panel.
Figure 31:
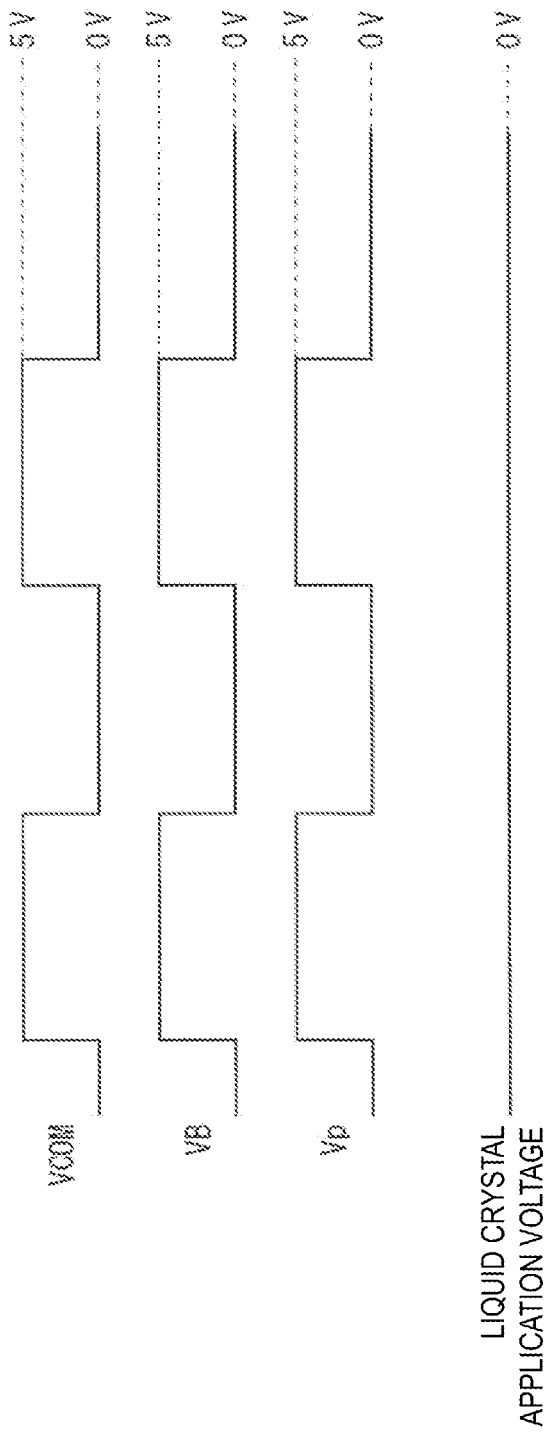
FIG. 31 is a waveform diagram when the white display is performed by the known memory liquid crystal display.
Figure 32:
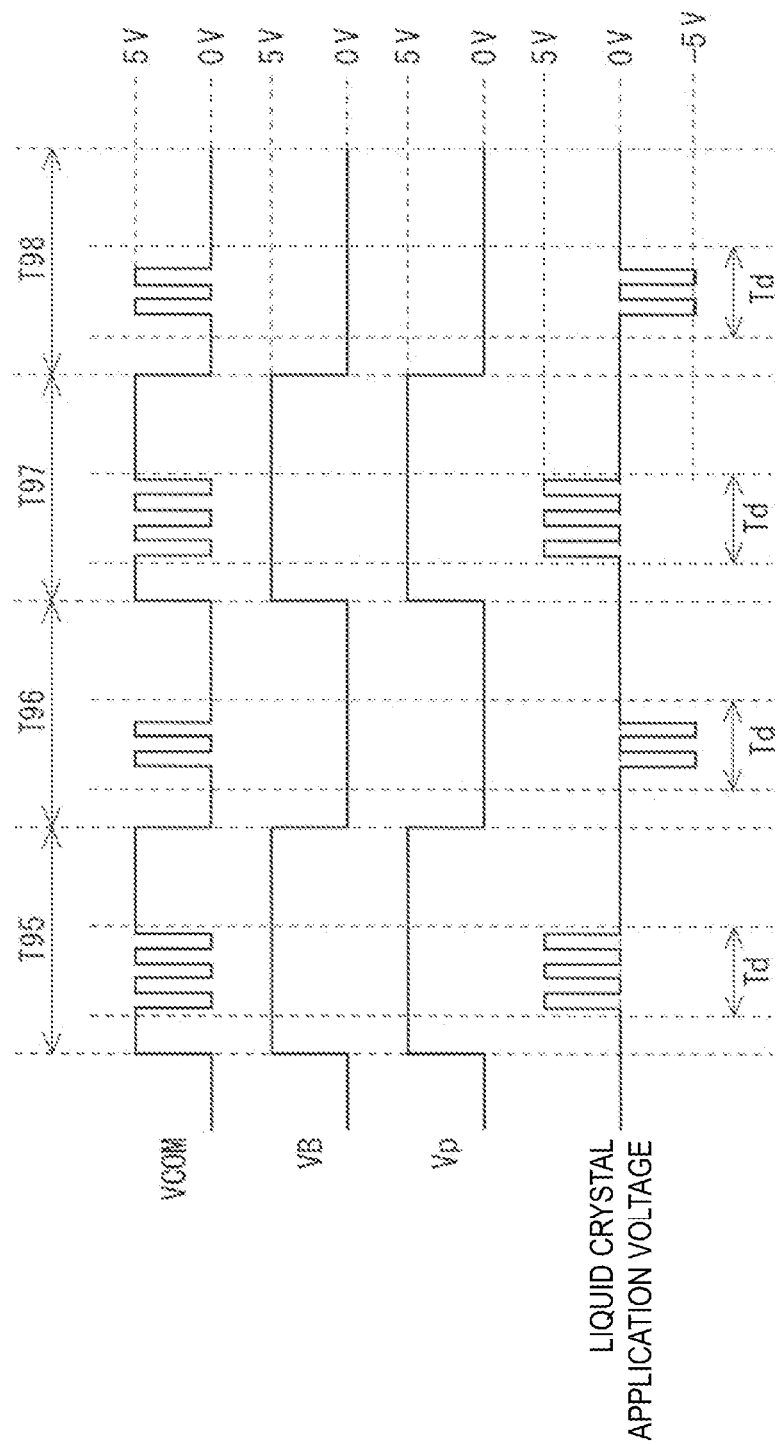
FIG. 32 is a waveform diagram when the white display is performed, assuming that the known memory liquid crystal display is provided with the in-cell type touch panel.

Next, a configuration of the pixel circuit 100 will be described. FIG. 7 is a schematic configuration illustrating the pixel circuit 100 in the present embodiment. Note that although a configuration of the pixel circuit 100 illustrated in FIG. 7 is substantially the same as the configuration of the known pixel circuit 100 illustrated in FIG. 28, for convenience of explanation, each component in FIG. 7 is denoted by a different sign from that of FIG. 28. As illustrated in FIG. 7, the pixel circuit 100 includes an input switch 110, a memory circuit 120, a voltage selection circuit 130, and a liquid crystal capacitance 140 constituted by a pixel electrode 102 and the common electrode 70. An auxiliary capacitance may be provided in parallel with the liquid crystal capacitance 140. Note that a portion including the input switch 110, the memory circuit 120, and the voltage selection circuit 130 is referred to a "display color control unit" for convenience. The display color control unit is denoted by a reference numeral 101.

A state of the input switch 110 is controlled by the first scanning signal GLA and the second scanning signal GLB. When the input switch 110 is in an on state, the data signal SL is supplied to the memory circuit 120. Note that the data signal SL is binary data. The memory circuit 120 stores the binary data based on the data signal SL. The voltage selection circuit 130 selects either the black voltage VA or the white voltage VB in accordance with a value of the binary data stored in the memory circuit 120. The voltage selected by the voltage selection circuit 130 is then applied to the pixel electrode 102, which is reflected in a display state of a pixel.

Figure 8:
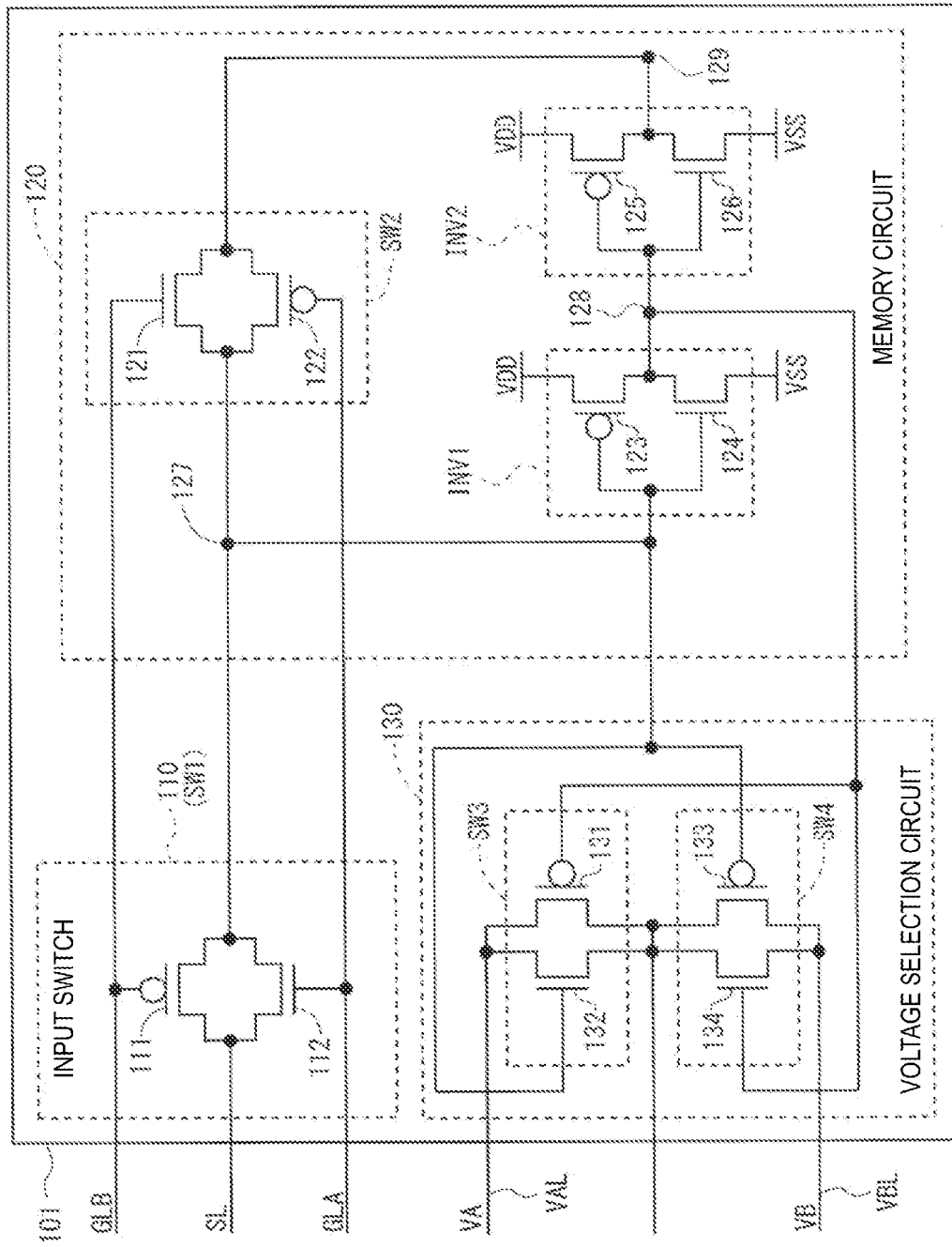
FIG. 8 is a circuit diagram illustrating a detailed configuration of a display color control unit in the first embodiment.

FIG. 8 is a circuit diagram illustrating a detailed configuration of a display color control unit 101. Note that the configuration illustrated in FIG. 8 is merely an example, and no such limitation is intended. The display color control unit 101 includes the input switch 110, the memory circuit 120, and the voltage selection circuit 130. The first scanning signal GLA, the second scanning signal GLB, the data signal SL, the black voltage VA, and the white voltage VB, are supplied to the display color control unit 101.

The input switch 110 is a CMOS switch including a p-channel transistor 111 and an n-channel transistor 112. Note that in the following, the input switch 110 is also referred to as a "first switch". The first switch is denoted by a reference sign SW1. The first switch SW1 is in the on state in a case where the first scanning signal GLA is at the high level and the second scanning signal GLB is at the low level. When the first switch SW1 is in the on state, a source bus line for transmitting the data signal SL and a node 127 are electrically connected to each other. As described above, in a case where the first scanning signal GLA is at the high level and the second scanning signal GLB is at the low level. the first switch SW1 is in the on state, and the voltage of the data signal SL is supplied to the node 127.

The memory circuit 120 is constituted by a second switch SW2, which is a CMOS switch including an n-channel transistor 121 and p-channel transistor 122, a first inverter INV1, which is a CMOS inverter including a p-channel transistor 123 and an n-channel transistor 124, and a second inverter INV2, which is a CMOS inverter including a p-channel transistor 125 and an n-channel transistor 126. The second switch SW2 is in the on state in a case where the second scanning signal GLB is at the high level and the first scanning signal GLA is at the low level. When the second switch SW2 is in the on state, the node 127 and a node 129 are electrically connected to each other. The first inverter INV1 includes an input terminal connected to the node 127, and an output terminal connected to a node 128. The second inverter INV2 includes an input terminal connected to the node 128, and an output terminal connected to the node 129. In the configuration described above, the memory circuit 120 functions to hold a value (logic value) based on the voltage supplied to the node 127 in a case where the first switch SW1 is in the on state until the next time the first switch SW1 is in the on state.

The voltage selection circuit 130 is constituted by a third switch SW3, which is a CMOS switch including an p-channel transistor 131 and an n-channel transistor 132, and a fourth switch SW4, which is a CMOS switch including an p-channel transistor 133 and an n-channel transistor 134. The third switch SW3 is in the on state in a case where the voltage of the node 127 is at the high level and the voltage at the node 128 is at the low level. When the third switch SW3 is in the on state, the black voltage VA is output from the voltage selection circuit 130. The fourth switch SW4 is in the on state in a case where the voltage of the node 127 is at the low level and the voltage at the node 128 is at the high level. When the fourth switch SW4 is in the on state, the white voltage VB is output from the voltage selection circuit 130.

According to the configuration described above, binary data is stored in the memory circuit 120 based on the voltage of the data signal when the first switch SW1 is in the on state. In the voltage selection circuit 130, the display voltage (either the black voltage VA or the white voltage VB) to be applied to the pixel electrode 102 is selected based on the binary data stored in the memory circuit 120. Then, the display state of the pixel is a white display or a black display, based on the display voltage applied to the pixel electrode 102.

1.3 Driving Method

Figure 1:
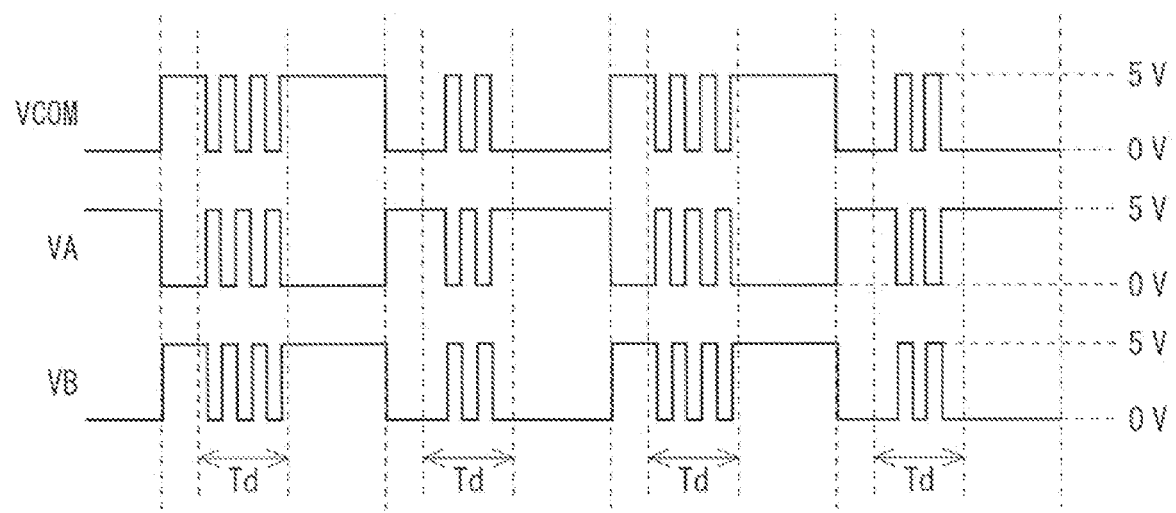
FIG. 1 is a voltage waveform diagram illustrating changes in voltage values of a common electrode voltage, a black voltage, and a white voltage in a first embodiment.

Next, a driving method will be described. Note that in all embodiments including the present embodiment, 5 V corresponds to the high-level voltage value, and 0 V corresponds to the low-level voltage value. FIG. 1 is a voltage waveform diagram illustrating changes in voltage values of a common electrode voltage VCOM, a black voltage VA, and a white voltage VB in the present embodiment. As illustrated in FIG. 1, the voltage values of all of the common electrode voltage VCOM, the black voltage VA, and the white voltage VB change between 5 V and 0 V. Except for the change in the voltage value in the touch detection period Td, the voltage values of all of the common electrode voltage VCOM, the black voltage VA, and the white voltage VB change periodically. The voltage value of the black voltage VA and the voltage value of the white voltage VB change inversely with each other. In other words, when the voltage value of the black voltage VA increases, the voltage value of the white voltage VB decreases, and when the voltage value of the black voltage VA decreases, the voltage value of the white voltage VB increases. Note that, although one touch detection period Td is provided each time the voltage value of the common electrode voltage VCOM changes in FIG. 1, the frequency of providing the touch detection period Td may be less than that.

As described above, in the touch detection period Td, the common electrode drive circuit 50 applies a continuous pulse voltage for touch detection to the common electrode 70. Accordingly, in the touch detection period Td, the common electrode voltage VCOM varies between 0 V and 5 V in a short cycle. As illustrated in FIG. 1, the display voltage generation circuit 65 changes the voltage values of the black voltage VA and the white voltage VB in synchronization with the continuous pulse voltage. More specifically, in the present embodiment, in the touch detection period Td, the display voltage generation circuit 65 changes the voltage value of the black voltage VA inversely with the voltage value of the common electrode voltage VCOM, and changes the voltage value of the white voltage VB similarly to the voltage value of the common electrode voltage VCOM. Note that, in the periods other than the touch detection period Td, the display voltage generation circuit 65 changes the voltage value of the black voltage VA inversely with the voltage value of the common electrode voltage VCOM, and changes the voltage value of the white voltage VB similarly to the voltage value of the common electrode voltage VCOM.

Figure 9:
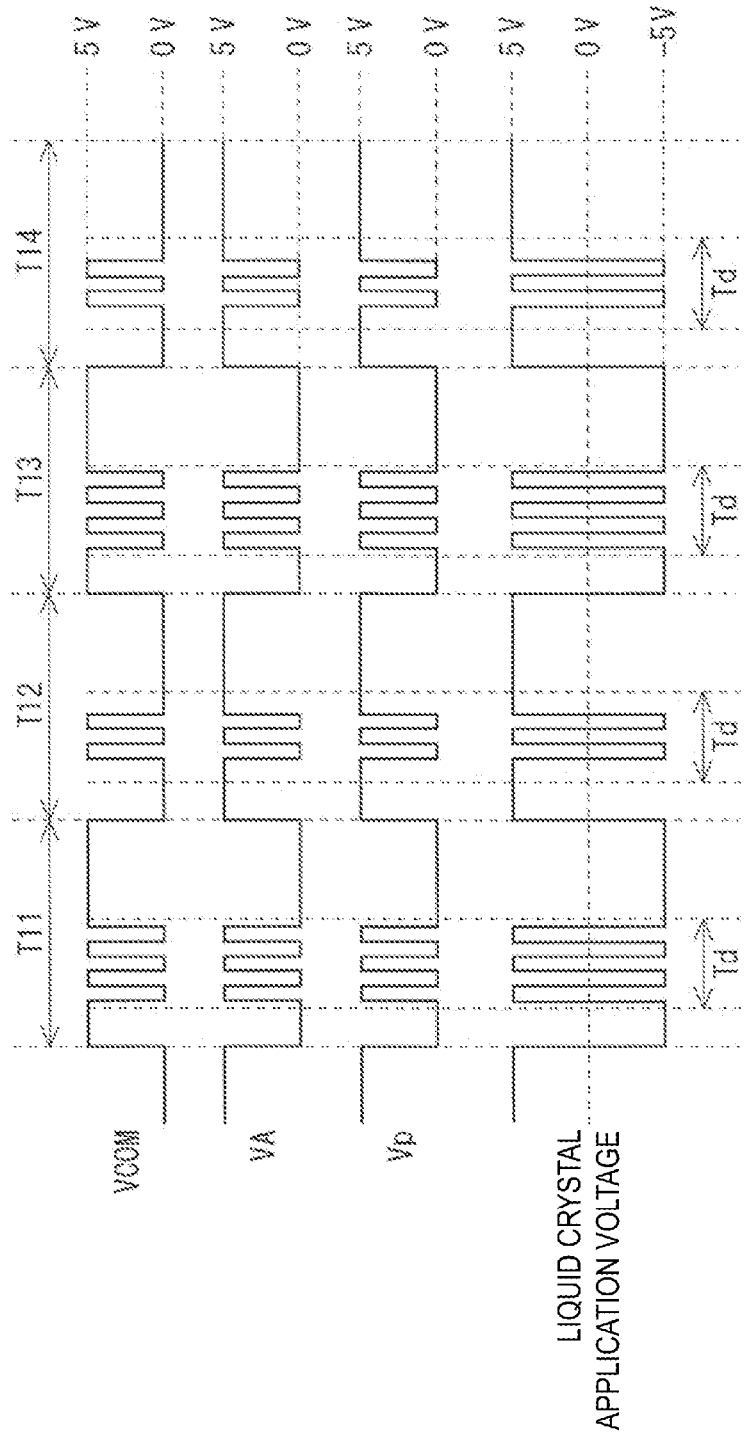
FIG. 9 is a waveform diagram when black display is performed by one pixel of interest in the first embodiment.

FIG. 9 is a waveform diagram when the black display is performed by one pixel of interest. Focusing on periods other than the touch detection period Td, the black voltage VA changes between 0 V and 5 V in synchronization with the change in the common electrode voltage VCOM. Specifically, in the periods other than the touch detection period Td, the black voltage VA is 0 V in a period in which the common electrode voltage VCOM is 5 V, and the black voltage VA is 5 V in a period in which the common electrode voltage VCOM is 0 V. By selecting the black voltage VA by the voltage selection circuit 130, the pixel electrode voltage Vp is equal to the black voltage VA in the periods other than the touch detection period Td. As described above, in the period other than the touch detection period Td, the liquid crystal application voltage is −5 V in the period in which the common electrode voltage VCOM is 5 V, and the liquid crystal application voltage is 5 V in the period in which the common electrode voltage VCOM is 0 V. As a result, the black display is performed.

In the touch detection period Td, as illustrated in FIG. 9, the common electrode voltage VCOM varies between 0 V and 5 V in a short cycle. Here, in the touch detection period Td, the display voltage generation circuit 65 changes the voltage value of the black voltage VA inversely with the voltage value of the common electrode voltage VCOM. As a result, in the touch detection period Td, the voltage value of the pixel electrode voltage Vp also changes inversely with the voltage value of the common electrode voltage VCOM. In other words, when the voltage value of the common electrode voltage VCOM changes from 5 V to 0 V, the voltage value of the pixel electrode voltage Vp changes from 0 V to 5 V, and when the voltage value of the common electrode voltage VCOM changes from 0 V to 5 V, the voltage value of the pixel electrode voltage Vp changes from 5 V to 0 V. Accordingly, the liquid crystal application voltage is 5 V in a period in which the voltage value of the common electrode voltage VCOM is 0 V, and the liquid crystal application voltage is −5 V in a period in which the voltage value of the common electrode voltage VCOM is 5 V. In this way, in the touch detection period Td, an absolute value of the liquid crystal application voltage is maintained at 5 V. Thus, the white display is not inserted in the period in which the black display is supposed to be performed.

Figure 10:
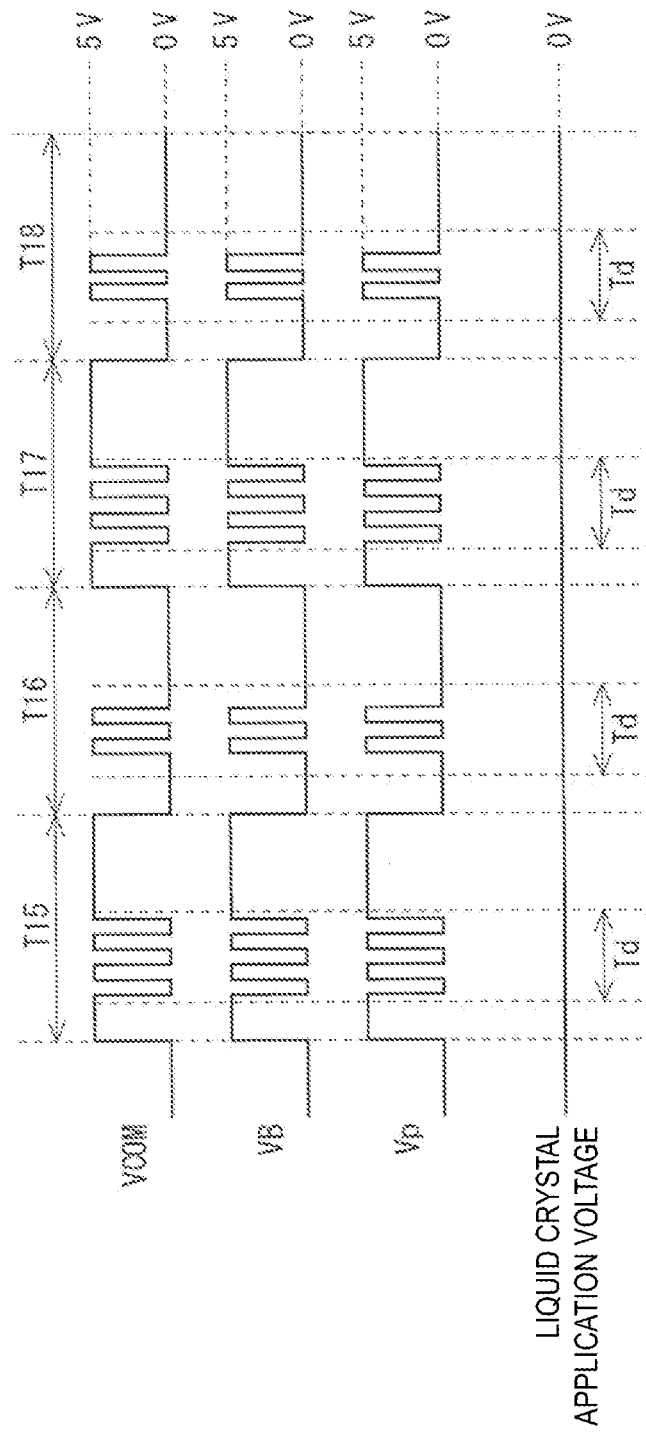
FIG. 10 is a waveform diagram when white display is performed by one pixel of interest in the first embodiment.

FIG. 10 is a waveform diagram when the white display is performed by one pixel of interest. Focusing on periods other than the touch detection period Td, the white voltage VB changes between 0 V and 5 V in synchronization with the change in the common electrode voltage VCOM. Specifically, in the periods other than the touch detection period Td, the white voltage VB is 5 V in a period in which the common electrode voltage VCOM is 5 V, and the white voltage VB is 0 V in a period in which the common electrode voltage VCOM is 0 V. By selecting the white voltage VB by the voltage selection circuit 130, the pixel electrode voltage Vp is equal to the white voltage VB in the periods other than the touch detection period Td. As described above, in the period other than the touch detection period Td, the liquid crystal application voltage is 0 V both in the period in which the common electrode voltage VCOM is 5 V and in the period in which the common electrode voltage VCOM is 0 V. As a result, the white display is performed.

In the touch detection period Td, as illustrated in FIG. 10, the common electrode voltage VCOM varies between 0 V and 5 V in a short cycle. Here, in the touch detection period Td, the display voltage generation circuit 65 changes the voltage value of the white voltage VB similarly to the voltage value of the common electrode voltage VCOM. As a result, in the touch detection period Td, the voltage value of the pixel electrode voltage Vp also changes similarly to the voltage value of the common electrode voltage VCOM. In other words, when the voltage value of the common electrode voltage VCOM changes from 5 V to 0 V, the voltage value of the pixel electrode voltage Vp changes from 5 V to 0 V, and when the voltage value of the common electrode voltage VCOM changes from 0 V to 5 V, the voltage value of the pixel electrode voltage Vp changes from 0 V to 5 V. Thus, the liquid crystal application voltage is 0 V both in the period in which the voltage value of the common electrode voltage VCOM is 0 V and in the period in which the voltage value of the common electrode voltage VCOM is 5 V. In this way, in the touch detection period Td, the liquid crystal application voltage is maintained at 0 V. Thus, the black display is not inserted in the period in which the white display is supposed to be performed.

As described above, in the touch detection period Td, the display voltage generation circuit 65 changes the voltage values of the black voltage VA and the white voltage VB in synchronization with the continuous pulse voltage for touch detection so that the absolute value of the voltage between the pixel electrode 102 and the common electrode 70 is maintained at a constant magnitude in each pixel circuit 100 throughout a period from a point in time immediately before the start of the touch detection period Td to a point in time immediately after the end of the touch detection period Td.

Note that although in this description, an example has been described in which a cycle of polarity inversion of the liquid crystal application voltage and a scanning cycle of the touch panel 7 (a cycle of supplying the continuous pulse voltage for touch detection to the common electrode 70) are the same, no such limitation is intended, and the cycle of polarity inversion of the liquid crystal application voltage and the scanning cycle of the touch panel 7 may be different from each other. In one example, the frequency of the polarity inversion of the liquid crystal application voltage is set to 0.5 Hz, and the scanning rate of the touch panel 7 is set to 80 Hz.

1.4 Effects

According to the present embodiment, in the memory liquid crystal display provided with the in-cell type touch panel 7 (the liquid crystal display device provided with the memory circuit 120 in the pixel circuit 100) that uses the common electrode 70 as an electrode for touch detection, the display voltage generation circuit 65 changes the voltage values of the black voltage VA and the white voltage VB in synchronization with the continuous pulse voltage for touch detection in the touch detection period Td. Specifically, in the touch detection period Td, the display voltage generation circuit 65 changes the voltage value of the black voltage VA inversely with the voltage value of the common electrode voltage VCOM and changes the voltage value of the white voltage VB similarly to the voltage value of the common electrode voltage VCOM. As a result, in the touch detection period Td, in a pixel in which the black display is supposed to be performed, the voltage value of the pixel electrode voltage Vp changes inversely with the voltage value of the common electrode voltage VCOM, and in a pixel in which the white display is supposed to be performed, the voltage value of the pixel electrode voltage Vp changes similarly to the voltage value of the common electrode voltage VCOM. Thus, the liquid crystal application voltage is maintained at the desired voltage throughout the touch detection period Td. Thus, the display defect (inversion of black and white) due to the pulse signal (continuous pulse voltage) for touch detection being supplied to the common electrode 70 does not occur. As described above, according to the present embodiment, the memory liquid crystal display provided with the in-cell type touch panel 7 is realized.

2. Second Embodiment

A second embodiment will be described below. Note that points different from the first embodiment will be mainly described below.

2.1 Configuration of Black Voltage Generation Circuit

In the present embodiment, the black voltage VA can take any one of 10 V, 5 V, 0 V, and −5 V as the voltage value at each point in time. The white voltage VB can take either 5 V or 0 V as the voltage value at each point in time, similar to the first embodiment.

Figure 11:
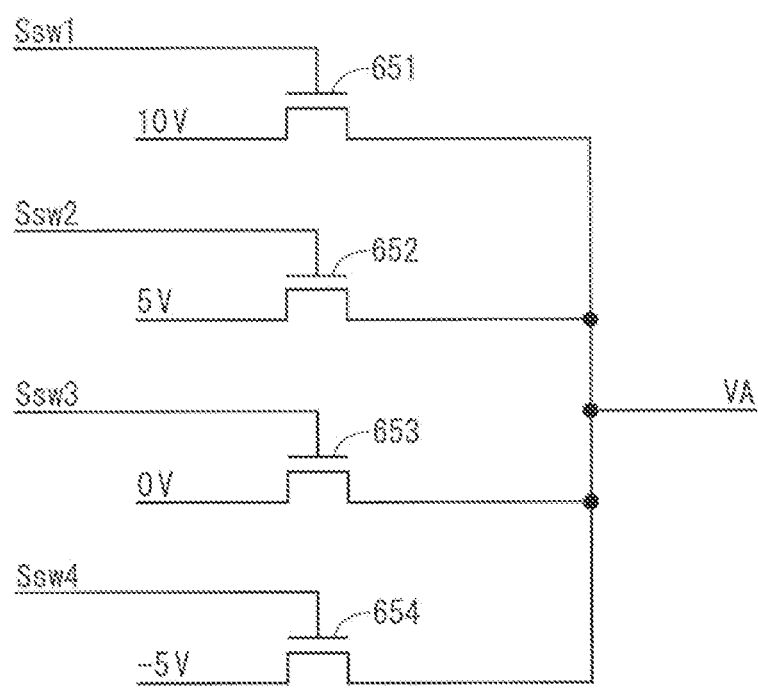
FIG. 11 is a circuit diagram illustrating a configuration example of a black voltage generation circuit in a second embodiment.

FIG. 11 is a circuit diagram illustrating a configuration example of a black voltage generation circuit in the present embodiment. As illustrated in FIG. 11, the black voltage generation circuit is constituted by four transistors 651 to 654 whose states are controlled by the control signals Ssw1 to Ssw4, respectively (the control signals Ssw1 to Ssw4 correspond to the display voltage control signal DCTL). When a voltage of 10 V is supposed to be output as the black voltage VA, only the transistor 651 in the on state, when a voltage of 5 V is supposed to be output as the black voltage VA, only the transistor 652 in the on state, when a voltage of 0 V is supposed to be output as the black voltage VA, only the transistor 653 is in the on state, and when a voltage of −5 V is supposed to be output as the black voltage VA, only the transistor 654 is in the on state. Note that a configuration similar to the circuit illustrated in FIG. 5 is adopted for the white voltage generation circuit.

2.2 Driving Method

Figure 12:
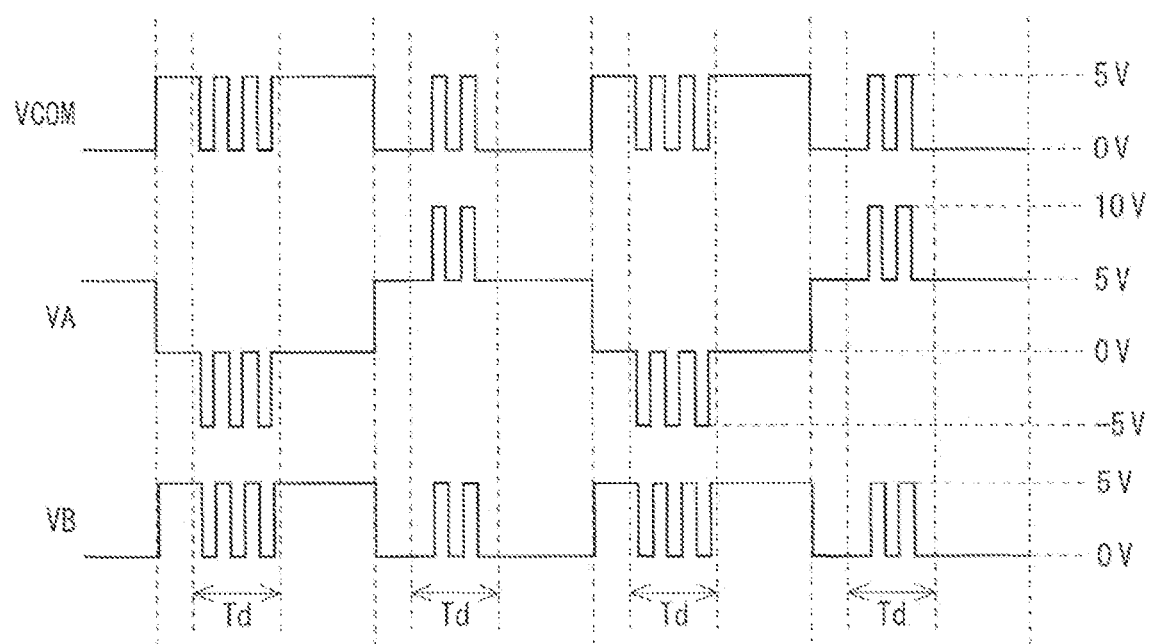
FIG. 12 is a voltage waveform diagram illustrating changes in voltage values of a common electrode voltage, a black voltage, and a white voltage in the second embodiment.

FIG. 12 is a voltage waveform diagram illustrating changes in voltage values of the common electrode voltage VCOM, the black voltage VA, and the white voltage VB in the present embodiment. As illustrated in FIG. 12, except for the touch detection period Td the voltage values of all of the common electrode voltage VCOM, the black voltage VA, and the white voltage VB periodically change between 5 V (high-level voltage value) and 0 V (low-level voltage value). Except for the touch detection period Td, the voltage value of the black voltage VA and the voltage value of the white voltage VB change inversely with each other.

In the touch detection period Td, similar to the first embodiment, the common electrode drive circuit 50 applies the continuous pulse voltage for touch detection to the common electrode 70. Accordingly, in the touch detection period Td, the common electrode voltage VCOM varies between 0 V and 5 V in a short cycle. As illustrated in FIG. 12, the display voltage generation circuit 65 changes the voltage values of the black voltage VA and the white voltage VB in synchronization with the continuous pulse voltage. More specifically, in the present embodiment, in the touch detection period Td, the display voltage generation circuit 65 increases the voltage values of the black voltage VA and the white voltage VB by a difference value (5 V) between the high-level voltage value (5 V) and the low-level voltage value (0 V) when the voltage value of the common electrode voltage VCOM increases, and decreases the voltage values of the black voltage VA and the white voltage VB by a difference value (5 V) between the high-level voltage value (5 V) and the low-level voltage value (0 V) when the voltage value of the common electrode voltage VCOM decreases. Note that as is understood from FIG. 12, the voltage value of the white voltage VB changes similarly to the voltage value of the common electrode voltage VCOM both in the periods other than the touch detection period Td and in the touch detection period Td.

Figure 13:
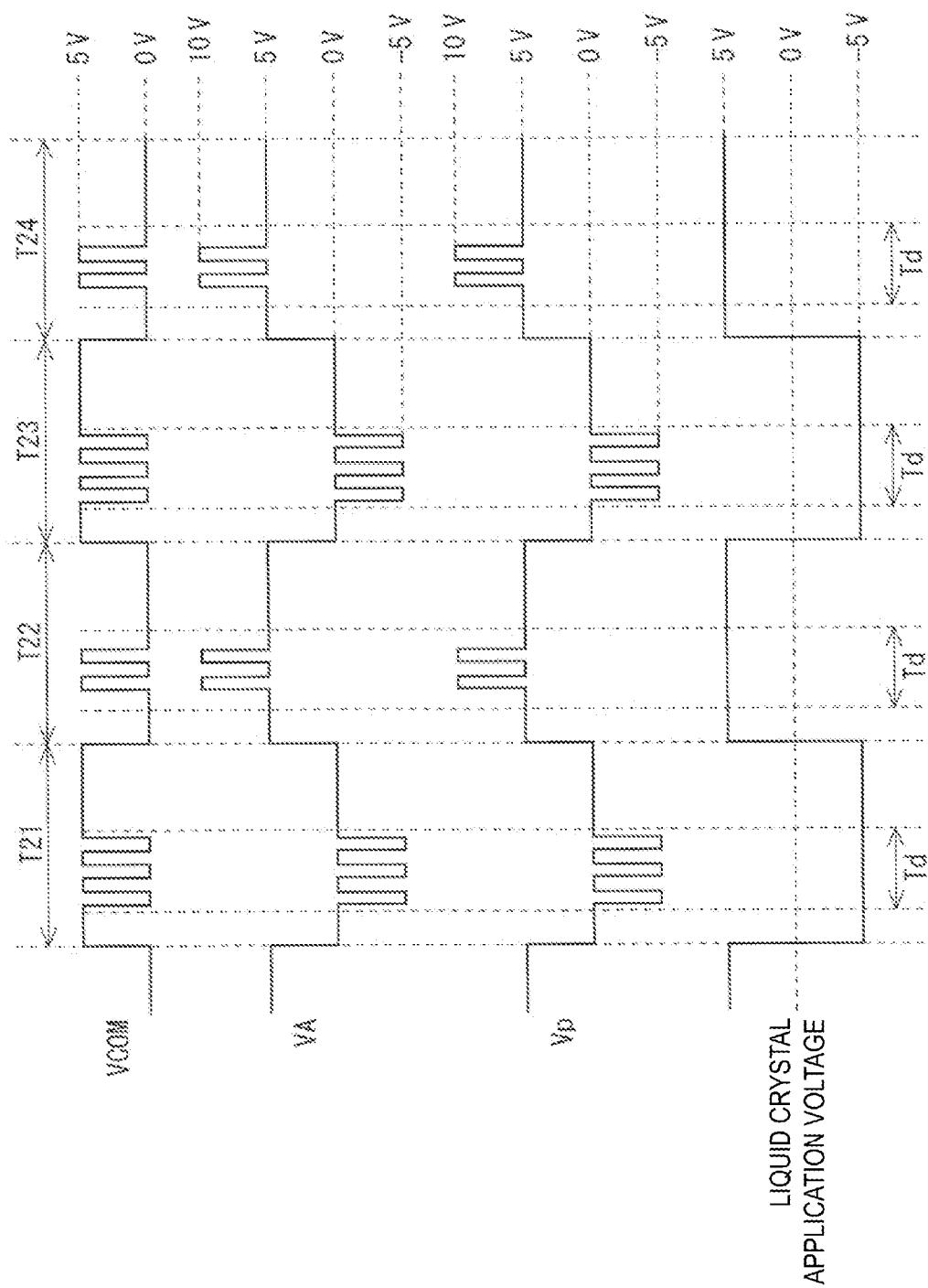
FIG. 13 is a waveform diagram when the black display is performed by one pixel of interest in the second embodiment.

FIG. 13 is a waveform diagram when the black display is performed by one pixel of interest. In the periods other than the touch detection period Td, similar to the first embodiment, the liquid crystal application voltage is −5 V in the period in which the common electrode voltage VCOM is 5 V, and the liquid crystal application voltage is 5 V in the period in which the common electrode voltage VCOM is 0 V. As a result, the black display is performed.

In the touch detection period Td, as illustrated in FIG. 13, the common electrode voltage VCOM varies between 0 V and 5 V in a short cycle. Here, in the touch detection period Td, the display voltage generation circuit 65 increases the voltage value of the black voltage VA by 5 V when the voltage value of the common electrode voltage VCOM increases from 0 V to 5 V, and the display voltage generation circuit 65 decreases the voltage value of the black voltage VA by 5 V when the voltage value of the common electrode voltage VCOM decreases from 5 V to 0 V. As a result, in the touch detection period Td, when the voltage value of the common electrode voltage VCOM increases, the voltage value of the pixel electrode voltage Vp also increases accordingly, and when the voltage value of the common electrode voltage VCOM decreases, the voltage value of the pixel electrode voltage Vp also decreases accordingly. As described above, the pixel electrode voltage Vp changes as if the pixel electrode 102 and the voltage selection circuit 130 are maintained in a state of being in an electrically disconnected from each other (the pixel electrode 102 is maintained in a floating state) throughout the touch detection period Td. Accordingly, the liquid crystal application voltage is maintained at a constant magnitude throughout the period from the point in time immediately before the start of the touch detection period Td to the point in time immediately after the end of the touch detection period Td. Thus, the white display is not inserted in the period in which the black display is supposed to be performed.

A waveform diagram when the white display is performed by one pixel of interest is similar to the first embodiment (see FIG. 10). In the periods other than the touch detection period Td, similar to the first embodiment, the liquid crystal application voltage is 0 V both in the period in which the common electrode voltage VCOM is 5 V and in the period in which the common electrode voltage VCOM is 0 V. As a result, the white display is performed.

In the touch detection period Td, similar to the first embodiment, the display voltage generation circuit 65 changes the voltage value of the white voltage VB similarly to the voltage value of the common electrode voltage VCOM. As a result, similar to the first embodiment, in the touch detection period Td, the liquid crystal application voltage is maintained at 0 V. Thus, the black display is not inserted in the period in which the white display is supposed to be performed.

2.3 Effects

According to the present embodiment, in the memory liquid crystal display provided with the in-cell type touch panel 7 that uses the common electrode 70 as an electrode for touch detection, in the touch detection period Td, the display voltage generation circuit 65 changes the voltage values of the black voltage VA and the white voltage VB in synchronization with the continuous pulse voltage for touch detection. Specifically, in the touch detection period Td, the display voltage generation circuit 65 increases the voltage values of the black voltage VA and the white voltage VB by the increase in a voltage value of a continuous pulse voltage when the voltage value of the continuous pulse voltage increases, and decreases the voltage value of the black voltage VA and the white voltage VB by the decrease in a voltage value of a continuous pulse voltage when the voltage value of the continuous pulse voltage decreases. As a result, both in the pixel in which the black display is supposed to be performed and in the pixel in which the white display is supposed to be performed, in the touch detection period Td, when the voltage value of the common electrode voltage VCOM increases, the voltage value of the pixel electrode voltage Vp also increases accordingly, and when the voltage value of the common electrode voltage VCOM decreases, the voltage value of the pixel electrode voltage Vp also decreases accordingly. Thus, the liquid crystal application voltage is maintained at the desired voltage throughout the touch detection period Td. Thus, the display defect (inversion of black and white) due to the pulse signal (continuous pulse voltage) for touch detection being supplied to the common electrode 70 does not occur. As described above, also in the present embodiment, the memory liquid crystal display provided with the in-cell type touch panel 7 is realized.

3. Third Embodiment

3.1 Outline

In the second embodiment, as can be understood from FIGS. 12 and 13, the display voltage generation circuit 65 needs to output a negative voltage as the black voltage VA. In other words, a negative power supply is required. As a result, increasing a circuit size and increasing a cost of the IC 8 (see FIG. 2) are concerns. Thus, in the present embodiment, in the touch detection period Td in a period in which the voltage value of the common electrode voltage VCOM is maintained at the high-level voltage value (5 V), the display voltage generation circuit 65 changes the voltage value of the black voltage VA as follows.

Figure 14:
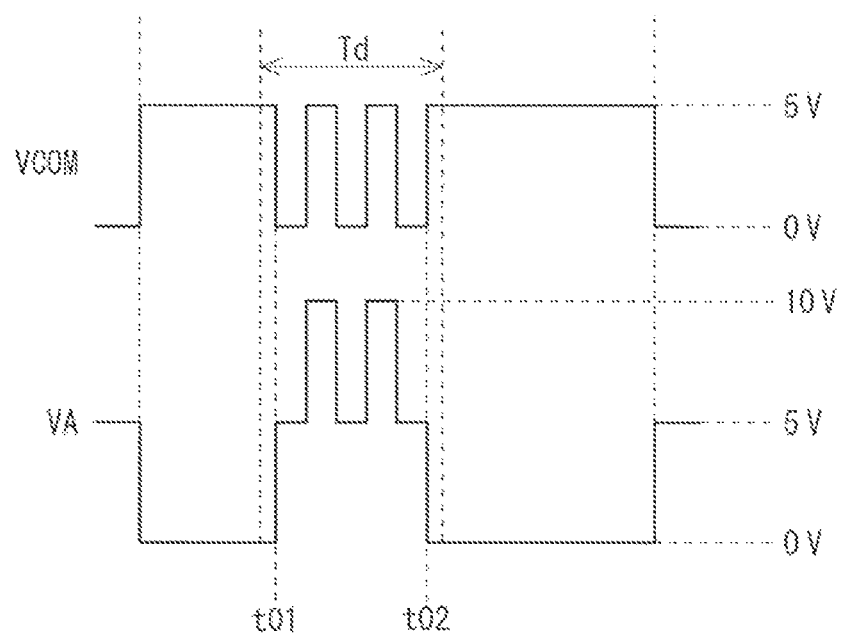
FIG. 14 is a diagram for describing a change in the voltage value of the black voltage in a touch detection period in a third embodiment.

When the voltage value of the continuous pulse voltage for touch detection first changes in the touch detection period Td (point in time t01 in FIG. 14), the common electrode voltage VCOM decreases from 5 V to 0 V. At this time, as illustrated in FIG. 14, the display voltage generation circuit 65 increases the voltage value of the black voltage VA from 0 V to 5 V. When the voltage value of the continuous pulse voltage last changes in the touch detection period Td (point in time t02 in FIG. 14), the common electrode voltage VCOM increases from 0 V to 5 V. At this time, as illustrated in FIG. 14, the display voltage generation circuit 65 decreases the voltage value of the black voltage VA from 5 V to 0 V. In this way, when the voltage value of the continuous pulse voltage first changes and when the voltage value of the continuous pulse voltage last changes in the touch detection period Td, the display voltage generation circuit 65 changes the voltage value of the black voltage VA inversely with the voltage value of the common electrode voltage VCOM. In a period from a point in time immediately after the voltage value of the continuous pulse voltage first changes to a point in time immediately before the voltage value of the continuous pulse voltage last changes in the touch detection period Td, when the voltage value of the common electrode voltage VCOM increases, the display voltage generation circuit 65 increases the voltage value of the black voltage VA accordingly, and when the voltage value of the common electrode voltage VCOM decreases, the display voltage generation circuit 65 decreases the voltage value of the black voltage VA accordingly. By the operation described above, the voltage value of the black voltage VA does not become a negative value. In other words, the negative power supply is not required.

3.2 Driving Method

Figure 15:
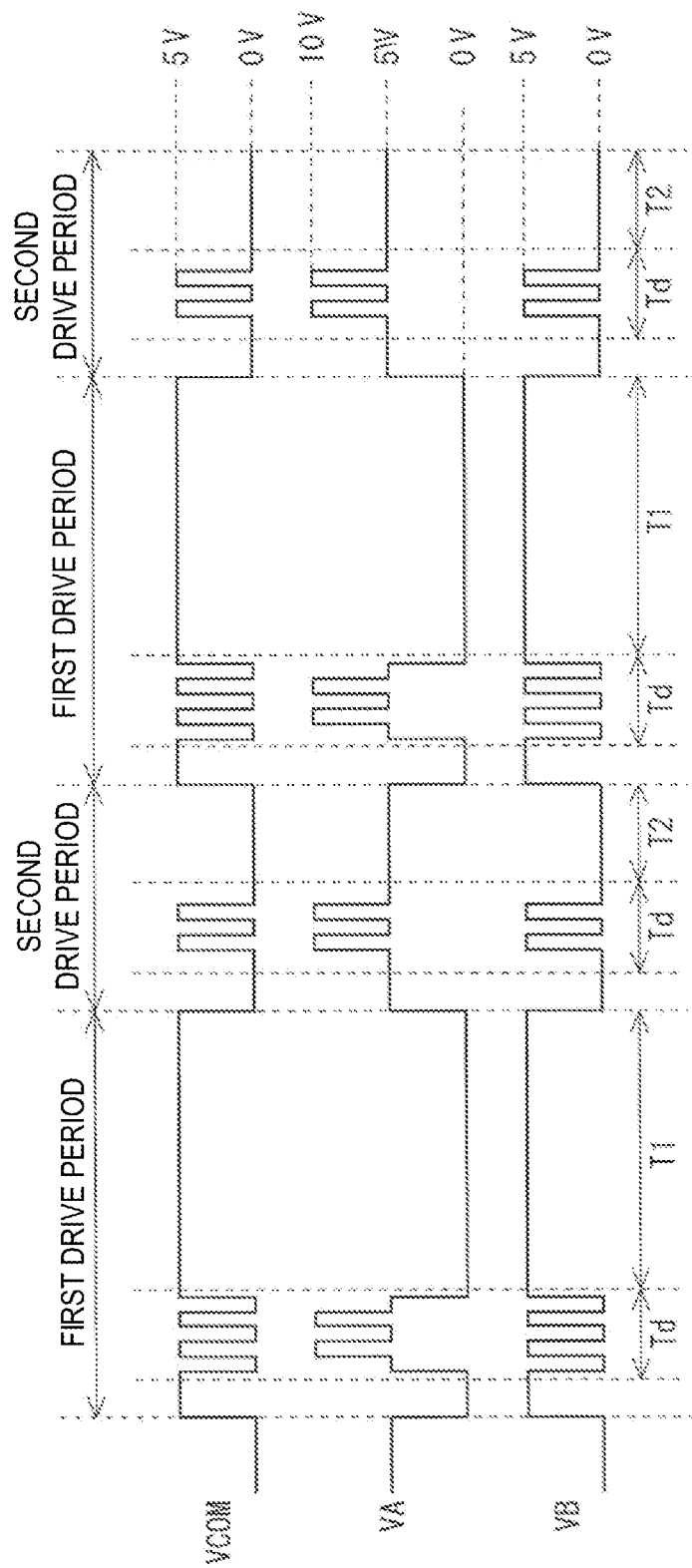
FIG. 15 is a voltage waveform diagram illustrating changes in voltage values of a common electrode voltage, a black voltage, and a white voltage in the third embodiment.

FIG. 15 is a voltage waveform diagram illustrating changes in voltage values of the common electrode voltage VCOM, the black voltage VA, and the white voltage VB in the present embodiment. As illustrated in FIG. 15, except for the touch detection period Td the voltage values of all of the common electrode voltage VCOM, the black voltage VA, and the white voltage VB periodically change between 5 V (high-level voltage value) and 0 V (low-level voltage value). Except for the touch detection period Td, the voltage value of the black voltage VA and the voltage value of the white voltage VB change inversely with each other.

In the touch detection period Td, similar to the first embodiment, the common electrode drive circuit 50 applies the continuous pulse voltage for touch detection to the common electrode 70. Accordingly, in the touch detection period Td, the common electrode voltage VCOM varies between 0 V and 5 V in a short cycle. In the touch detection period Td in a period in which the voltage value of the common electrode voltage VCOM is maintained at the high-level voltage value (5 V), the display voltage generation circuit 65 changes the voltage value of the black voltage VA as described above (see FIG. 14), and changes the voltage value of the white voltage VB similarly to the second embodiment. In the touch detection period Td in a period in which the voltage value of the common electrode voltage VCOM is maintained at the low-level voltage value (0 V), similar to the second embodiment, the display voltage generation circuit 65 increases the voltage values of the black voltage VA and the white voltage VB by 5 V, when the voltage value of the common electrode voltage VCOM increases, and decreases the voltage values of the black voltage VA and the white voltage VB by 5 V, when the voltage value of the common electrode voltage VCOM decreases.

Figure 16:
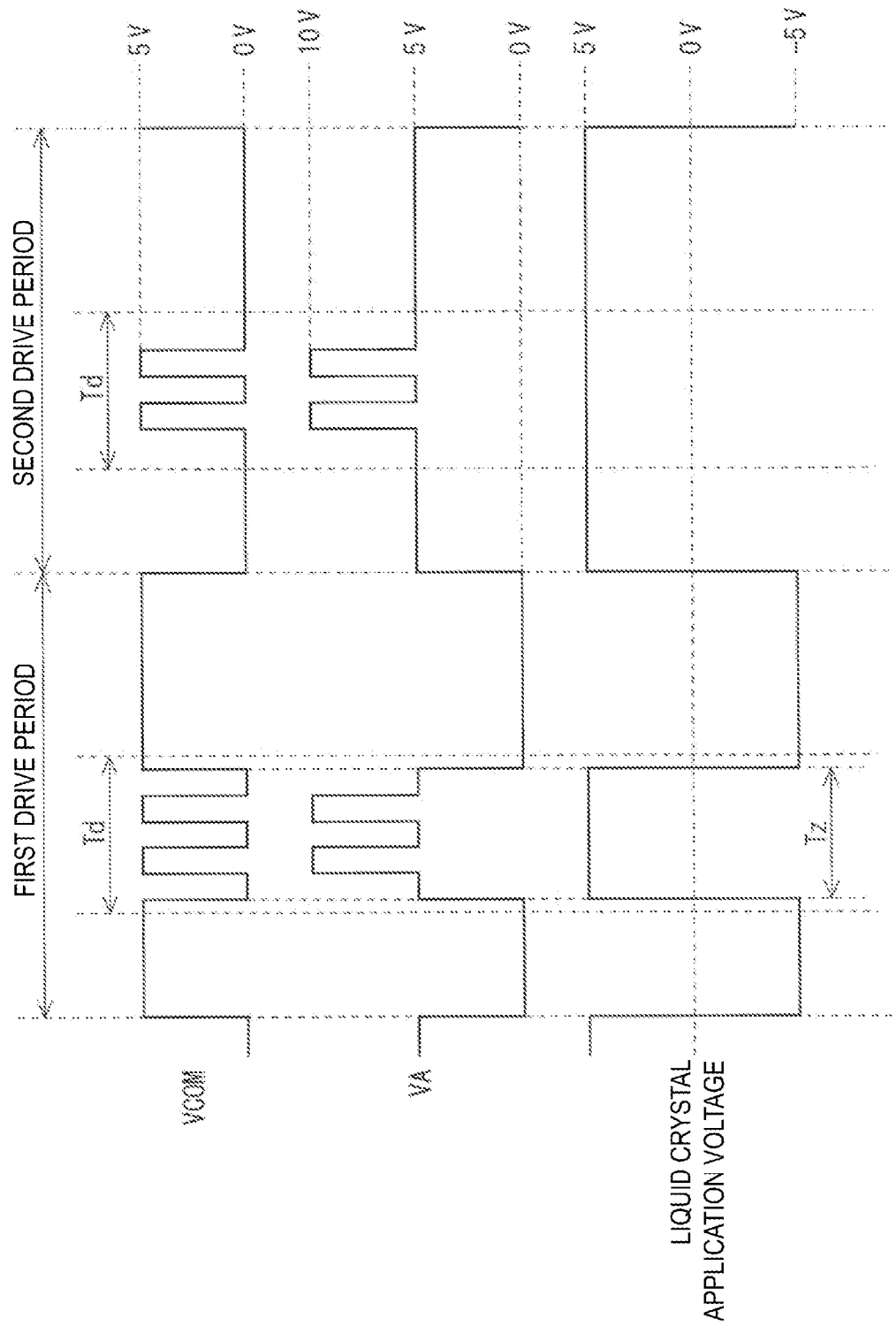
FIG. 16 is a diagram for describing a period in which the liquid crystal application voltage is positive and a period in which the liquid crystal application voltage is negative in the third embodiment.

Here, a period in which the voltage value of the common electrode voltage VCOM is supposed to be maintained at the high-level voltage value (5 V) is defined as a "first drive period", and a period in which the voltage value of the common electrode voltage VCOM is supposed to be maintained at the low-level voltage value (0 V) is defined as a "second drive period". Assuming that a length of the first drive period is equal to a length of the second drive period, the common electrode voltage VCOM, the black voltage VA, and the liquid crystal application voltage change as illustrated in FIG. 16 in the pixels in which the black display is supposed to be performed. As can be understood from FIG. 16, in the second drive period, the liquid crystal application voltage is maintained at 5 V. In contrast, in the first drive period, although the liquid crystal application voltage is maintained at −5 V in the periods other than the touch detection period Td, the liquid crystal application voltage is maintained at 5 V in the period from the point in time when the voltage value of the continuous pulse voltage for touch detection first changes to the point in time when the voltage value last changes in the touch detection period Td. Accordingly, when a length of the period from the point in time when the voltage value of the continuous pulse voltage first changes to the point in time when the voltage value last changes in the touch detection period Td is represented by Tz, in a period including the first drive period and the second drive period (the period of one cycle of the common electrode voltage VCOM), a length of a period in which a positive polarity voltage is applied to the liquid crystal is longer than a length of a period in which a negative polarity voltage is applied to the liquid crystal by 2Tz, in the pixel in which the black display is supposed to be performed. This causes the liquid crystal to be deteriorated.

Thus, in the present embodiment, in order to prevent deterioration of the liquid crystal, as illustrated in FIG. 15, a length T1 of a period from the ending point in time of the touch detection period Td in the first drive period to the ending point in time of the first drive period is set longer by 2Tz than a length T2 of a period from the ending point in time of the touch detection period Td in the second drive period to the ending point in time of the second drive period. However, no such limitation is intended as long as the following equation is satisfied, where Ta is a length of periods other than the touch detection period Td in the first drive period and Tb is a length of periods other than the touch detection period Td in the second drive period.

$$Ta-Tb=2\times Tz$$

Note that each time one touch detection period Td is provided in the first drive period, one touch detection period Td is provided in the second drive period.

Figure 17:
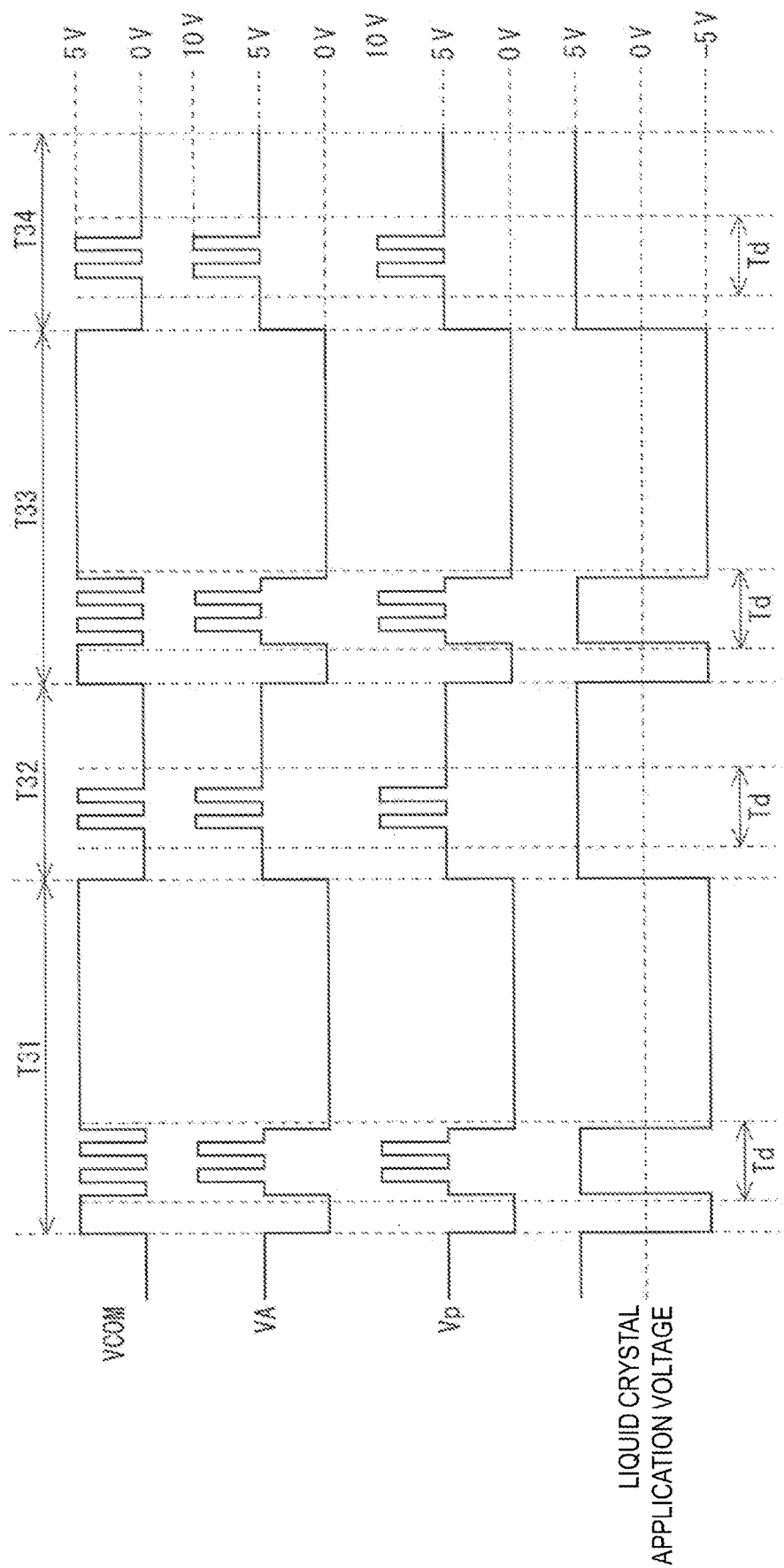
FIG. 17 is a waveform diagram when the black display is performed by one pixel of interest in the third embodiment.

FIG. 17 is a waveform diagram when the black display is performed by one pixel of interest. In the periods other than the touch detection period Td, similar to the first embodiment, the liquid crystal application voltage is −5 V in the period in which the common electrode voltage VCOM is 5 V, and the liquid crystal application voltage is 5 V in the period in which the common electrode voltage VCOM is 0 V. As a result, the black display is performed.

In the touch detection period Td, as illustrated in FIG. 17, the common electrode voltage VCOM varies between 0 V and 5 V in a short cycle. Here, first, attention is focused on the touch detection period Td in periods T31 and T33 in which the voltage value of the common electrode voltage VCOM is supposed to be maintained at the high-level voltage value (5 V). After the start of the touch detection period Td, the voltage value of the common electrode voltage VCOM decreases from 5 V to 0 V. At this time, as described above, the display voltage generation circuit 65 increases the voltage value of the black voltage VA from 0 V to 5 V. As a result, the voltage value of the pixel electrode voltage Vp also increases from 0 V to 5 V. As a result, the liquid crystal application voltage changes from −5 V to 5 V. Thereafter, the display voltage generation circuit 65 increases the voltage value of the black voltage VA from 5 V to 10 V when the voltage value of the common electrode voltage VCOM increases from 0 V to 5 V, and the display voltage generation circuit 65 decreases the voltage value of the black voltage VA from 10 V to 5 V when the voltage value of the common electrode voltage VCOM decreases from 5 V to 0 V. As a result, when the voltage value of the common electrode voltage VCOM increases, the voltage value of the pixel electrode voltage Vp also increases accordingly, and when the voltage value of the common electrode voltage VCOM decreases, the voltage value of the pixel electrode voltage Vp also decreases accordingly. In other words, the liquid crystal application voltage is maintained at a constant magnitude. Immediately before the end of the touch detection period Td, the voltage value of the common electrode voltage VCOM increases from 0 V to 5 V. At this time, as described above, the display voltage generation circuit 65 decreases the voltage value of the black voltage VA from 5 V to 0 V. Accordingly, the voltage value of the pixel electrode voltage Vp also decreases from 5 V to 0 V. As a result, the liquid crystal application voltage changes from 5 V to −5 V. As described above, the absolute value of the liquid crystal application voltage is maintained at a constant magnitude throughout the period from the point in time immediately before the start of the touch detection period Td to the point in time immediately after the end of the touch detection period Td. Next, attention is focused on the touch detection period Td in periods T32 and T34 in which the voltage value of the common electrode voltage VCOM is supposed to be maintained at the low-level voltage value (0 V). In the touch detection period Td, the display voltage generation circuit 65 increases the voltage value of the black voltage VA from 5 V to 10 V when the voltage value of the common electrode voltage VCOM increases from 0 V to 5 V, and the display voltage generation circuit 65 decreases the voltage value of the black voltage VA from 10 V to 5 V when the voltage value of the common electrode voltage VCOM decreases from 5 V to 0 V. As a result, when the voltage value of the common electrode voltage VCOM increases, the voltage value of the pixel electrode voltage Vp also increases accordingly, and when the voltage value of the common electrode voltage VCOM decreases, the voltage value of the pixel electrode voltage Vp also decreases accordingly. In other words, the liquid crystal application voltage is maintained at a constant magnitude. As described above, the liquid crystal application voltage is maintained at a constant magnitude throughout the period from the point in time immediately before the start of the touch detection period Td to the point in time immediately after the end of the touch detection period Td.

As described above, both in the periods T31 and T33 in which the voltage value of the common electrode voltage VCOM is supposed to be maintained at the high-level voltage value (5 V), and in the periods T32 and T34 in which the voltage value of the common electrode voltage VCOM is supposed to be maintained at the low-level voltage value (0 V), the absolute value of the liquid crystal application voltage is maintained at 5 V. Thus, the white display is not inserted in the period in which the black display is supposed to be performed.

Figure 18:
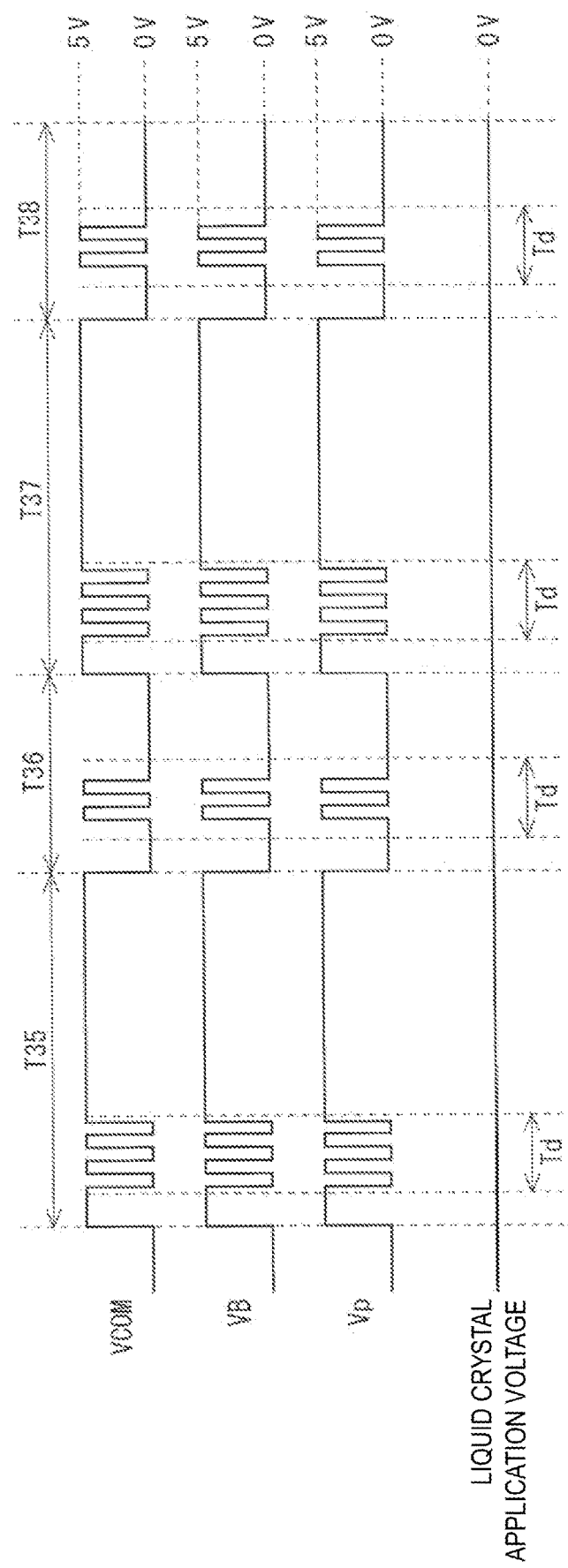
FIG. 18 is a waveform diagram when the white display is performed by one pixel of interest in the third embodiment.

FIG. 18 is a waveform diagram when the white display is performed by one pixel of interest. In the periods other than the touch detection period Td, similar to the first embodiment, the liquid crystal application voltage is 0 V both in the period in which the common electrode voltage VCOM is 5 V and in the period in which the common electrode voltage VCOM is 0 V. As a result, the white display is performed.

In the touch detection period Td, similar to the first embodiment, the display voltage generation circuit 65 changes the voltage value of the white voltage VB similarly to the voltage value of the common electrode voltage VCOM. As a result, similar to the first embodiment, in the touch detection period Td, the liquid crystal application voltage is maintained at 0 V. Thus, the black display is not inserted in the period in which the white display is supposed to be performed.

3.3 Effects

According to the present embodiment, similar to the second embodiment, in the memory liquid crystal display provided with the in-cell type touch panel 7 that uses the common electrode 70 as the electrode for touch detection, the display defect (inversion of black and white) due to the pulse signal (continuous pulse voltage) for touch detection being supplied to the common electrode 70 does not occur. Here, in the period in which the voltage value of the common electrode voltage VCOM is supposed to be main-tained at the high-level voltage value (5 V), the display voltage generation circuit 65 changes the voltage value of the black voltage VA inversely with the voltage value of the common electrode voltage VCOM when the voltage value of the continuous pulse voltage first changes and when the voltage value of the continuous pulse voltage last changes in the touch detection period Td. Thus, unlike the second embodiment, the voltage value of the black voltage VA does not become the negative value in the touch detection period Td. In other words, the negative power supply is not required. As described above, according to the present embodiment, the memory liquid crystal display provided with the in-cell type touch panel 7 is realized without requiring the negative power supply.

4. Modification Example 4.1 First Modification Example

In each of the above-described embodiments, in the touch detection period Td, the pulse signal (continuous pulse voltage) for touch detection is supplied to the common electrode 70. Various wiring lines such as the first gate bus line, the second gate bus line, the source bus line, and the like are arranged on the common electrode 70. When the potentials of the various wiring lines are maintained at a fixed potential, parasitic capacitances can be formed by the various wiring lines and the common electrode 70. Thus, in consideration of the presence of such parasitic capacitances, it is necessary to reduce the frequency of the pulse signal for touch detection.

Thus, in the present modification example, in order to prevent the various wiring lines from causing parasitic capacitance formation in the touch detection period Td, components for maintaining the various wiring lines in the floating state through the touch detection period Td are provided. Specifically, a switch circuit configured to switch the various wiring lines between the floating state and the non-floating state is provided at positions denoted by reference numerals 86 and 87 in FIG. 19. A detailed description will be further given below.

Figure 19:
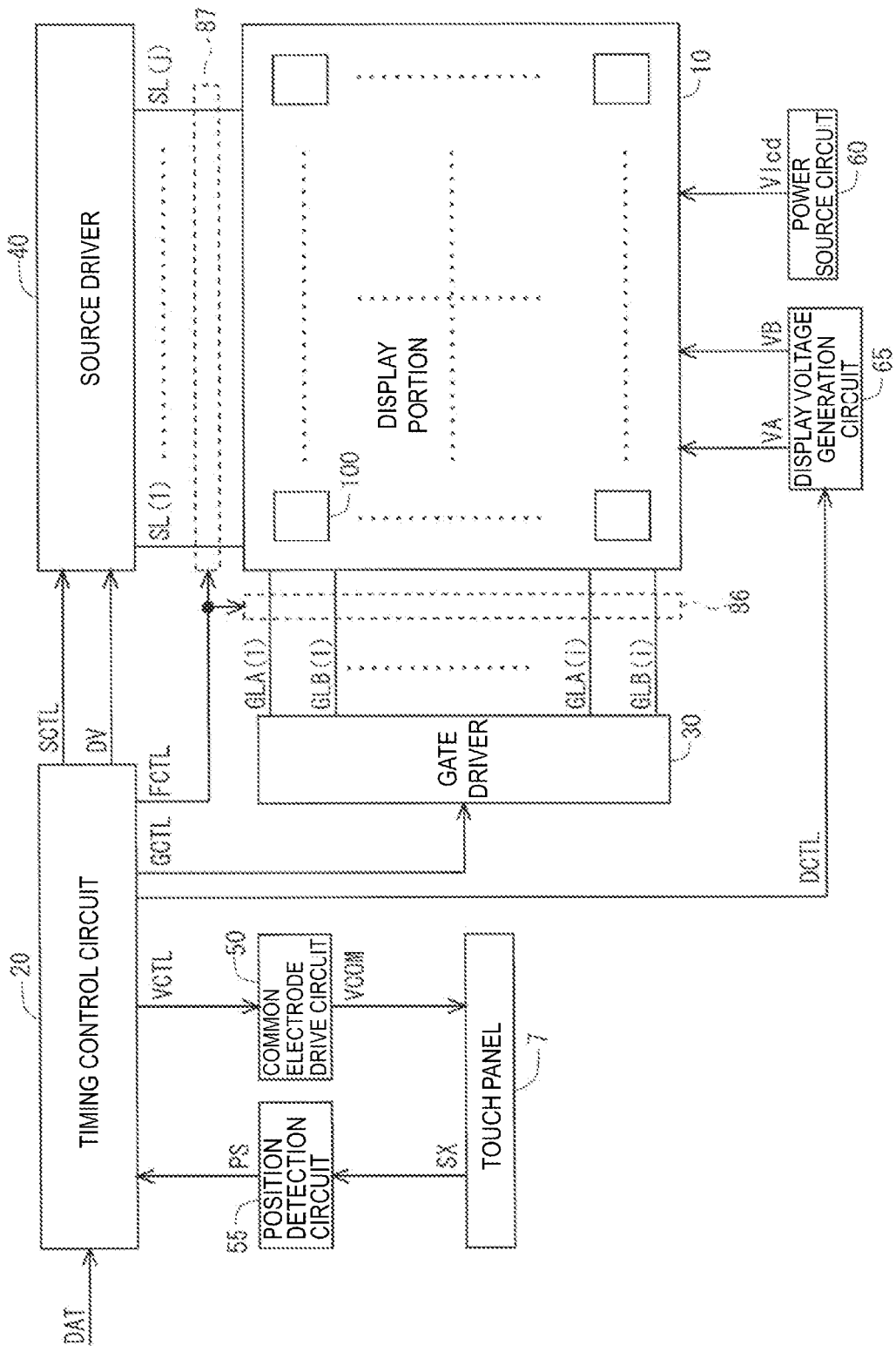
FIG. 19 is a block diagram for describing a configuration of a liquid display device in a first modification example.
Figure 20:
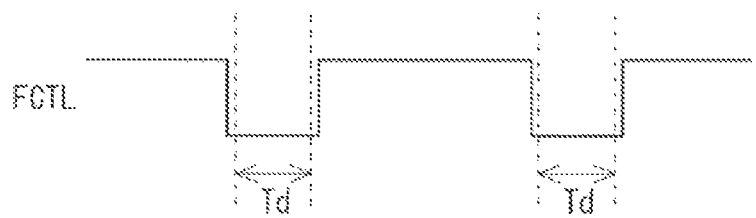
FIG. 20 is a waveform diagram of a floating control signal in the first modification example.

A scanning signal supply control switch circuit configured to control the electrical connection state between the gate driver 30 and the first gate bus line and the second gate bus line in the display portion 10 is provided in the position denoted by the reference numeral 86 in FIG. 19. A data signal supply control switch circuit configured to control the electrical connection state between the source driver 40 and the source bus line in the display portion 10 is provided in the position denoted by the reference numeral 87 in FIG. 19. The floating control signal FCTL is supplied from the timing control circuit 20 to the scanning signal supply control switch circuit and the data signal supply control switch circuit. As illustrated in FIG. 20, in the present modification example, the floating control signal FCTL changes from the high level to the low level immediately before the starting point in time of the touch detection period Td, and changes from the low level to the high level immediately after the ending point in time of the touch detection period Td.

Attention is focused on the scanning signal supply control switch circuit. When the floating control signal FCTL is at the high level, the gate driver 30 and the first gate bus line and the second gate bus line in the display portion 10 are in the state of being electrically connected to each other, and when the floating control signal FCTL is at the low level, the gate driver 30 and the first gate bus line and the second gate bus line in the display portion 10 are in the state of being electrically disconnected from each other. As described above, the scanning signal supply control switch circuit electrically disconnects the gate driver 30 and the first gate bus line and the second gate bus line in the display portion 10 from each other before the start of the touch detection period Td, and electrically connects the gate driver 30 and the first gate bus line and the second gate bus line in the display portion 10 to each other after the end of the touch detection period Td. As a result, the first gate bus line and the second gate bus line are prevented from causing the parasitic capacitance formation in the touch detection period Td.

Next, attention is focused on the data signal supply control switch circuit. When the floating control signal FCTL is at the high level, the source driver 40 and the source bus line in the display portion 10 are in the state of being electrically connected to each other, and when the floating control signal FCTL is at the low level, the source driver 40 and the source bus line in the display portion 10 are in the state of being electrically disconnected from each other. As described above, the data signal supply control switch circuit electrically disconnects the source driver 40 and the source bus line in the display portion 10 from each other before the start of the touch detection period Td, and electrically connects the source driver 40 and the source bus line in the display portion 10 to each other after the end of the touch detection period Td. As a result, the source bus line is prevented from causing the parasitic capacitance formation in the touch detection period Td.

4.2 Second Modification Example

In each of the embodiments described above, a case where both an amplitude of the pulse signal (continuous pulse voltage) for touch detection and an amplitude of the common electrode voltage VCOM in the periods other than the touch detection period Td are 5 V is described as an example, but no such limitation is intended. The amplitude of the pulse signal for touch detection and the amplitude of the common electrode voltage VCOM in the periods other than the touch detection period Td can be freely set. The amplitude of the pulse signal for touch detection and the amplitude of the common electrode voltage VCOM in the periods other than the touch detection period Td may be different from each other. For example, as illustrated in FIG. 21, the amplitude of the common electrode voltage VCOM in the periods other than the touch detection period Td may be 5 V, and the amplitude of the pulse signal for touch detection may be 3 V.

Figure 22:
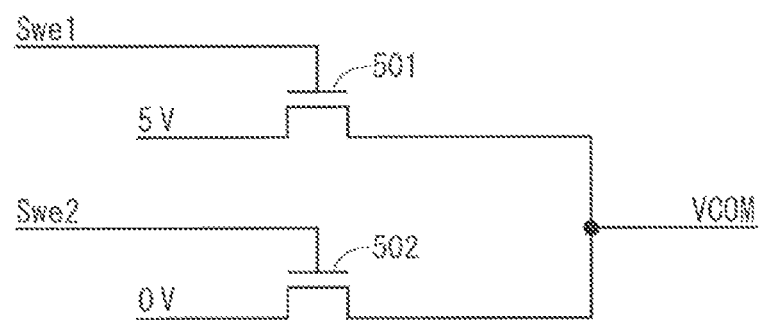
FIG. 22 is a circuit diagram illustrating a configuration example of a common electrode drive circuit in the first to third embodiments.

In the embodiments described above, the common electrode drive circuit 50 (see FIG. 3) includes, for example, as illustrated in FIG. 22, a transistor 501 whose state is controlled by a control signal Swe1 and a transistor 502 whose state is controlled by a control signal Swe2 (the control signal Swe1 and the control signal Swe2 correspond to the common electrode control signal VCTL). When a voltage of 5 V is applied to the common electrode 70, only the transistor 501 is in the on state, and when a voltage of 0 V is applied to the common electrode 70, only the transistor 502 is in the on state. Note that although the transistors 501 and 502 functioning as switches are illustrated as re-channel transistors in FIG. 22, each transistor functioning as a switch may be realized by, for example, a p-channel transistor or a CMOS transistor (the same applies to FIG. 23).

Figure 21:
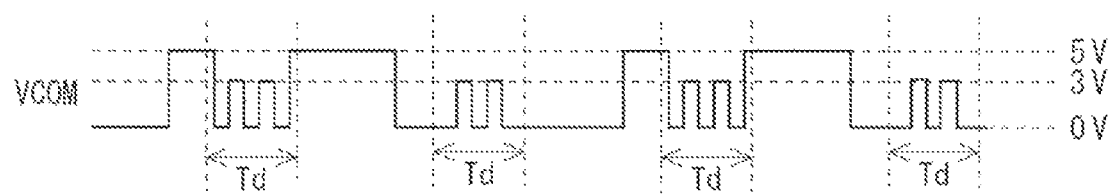
FIG. 21 is a diagram illustrating an example of a waveform of a common electrode voltage in a second modification example.
Figure 23:
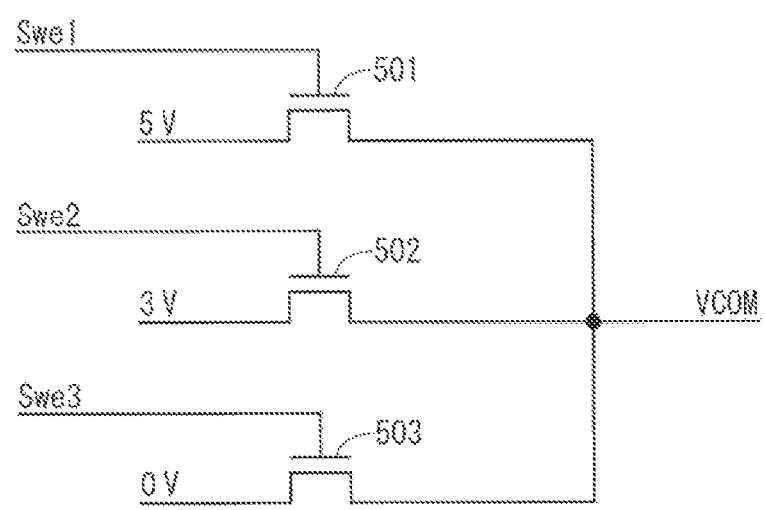
FIG. 23 is a circuit diagram illustrating a configuration example of a common electrode drive circuit in the second modification example.

In contrast, in a case where a waveform such as that illustrated in FIG. 21 is employed, the common electrode drive circuit 50 includes, for example, as illustrated in FIG. 23, the transistor 501 whose state is controlled by the control signal Swe1, the transistor 502 whose state is controlled by the control signal Swe2 and a transistor 503 whose state is controlled by a control signal Swe3 (the control signals Swe1 to Swe3 correspond to the common electrode control signal VCTL). When a voltage of 5 V is applied to the common electrode 70, only the transistor 501 is in the on state, when a voltage of 3 V is applied to the common electrode 70, only the transistor 502 is in the on state, and when a voltage of 0 V is applied to the common electrode 70, only the transistor 503 is in the on state.

Figure 24:
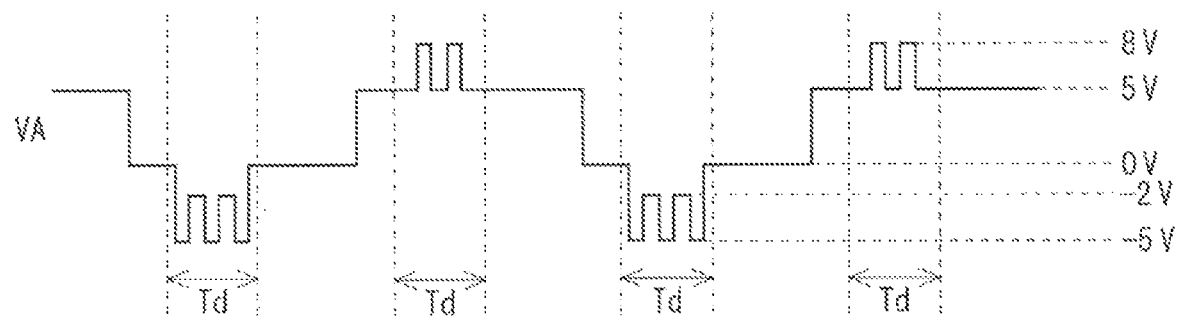
FIG. 24 is a waveform diagram of the black voltage when the black display is performed by one pixel of interest in a case where the second modification example is applied to the second embodiment.
Figure 25:
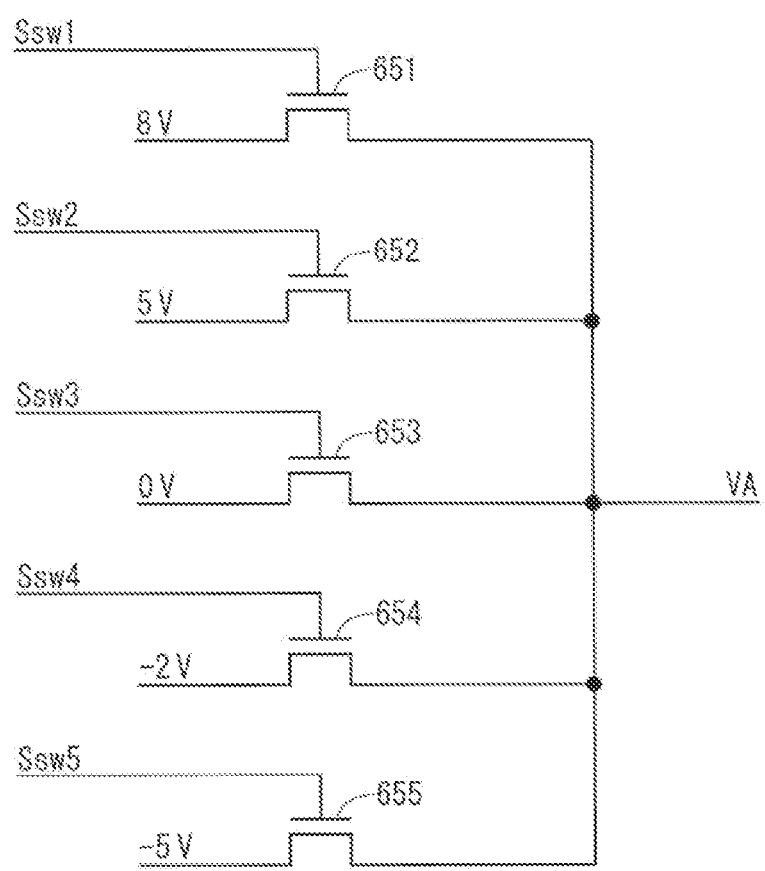
FIG. 25 is a circuit diagram illustrating a configuration example of the black voltage generation circuit in a case where the second modification example is applied to the second embodiment.

For example, in a case where the present modification (a waveform such as that illustrated in FIG. 21) is applied to the second embodiment, a waveform of the black voltage VA when the black display is performed by one pixel of interest is as illustrated in FIG. 24. In order to realize such a waveform, the configuration of the black voltage generation circuit is as illustrated in FIG. 25, for example. The black voltage generation circuit illustrated in FIG. 25 is constituted by five transistors 651 to 655 whose states are controlled by the control signals Ssw1 to Ssw5, respectively (the control signals Ssw1 to Ssw5 correspond to the display voltage control signal DCTL). When a voltage of 8 V is supposed to be output as the black voltage VA, only the transistor 651 in the on state, when a voltage of 5 V is supposed to be output as the black voltage VA, only the transistor 652 in the on state, when a voltage of 0 V is supposed to be output as the black voltage VA, only the transistor 653 is in the on state, when a voltage of −2 V is supposed to be output as the black voltage VA, only the transistor 654 is in the on state, and when a voltage of −5 V is supposed to be output as the black voltage VA, only the transistor 655 is in the on state. Note that a configuration similar to the circuit illustrated in FIG. 5 is adopted for the white voltage generation circuit.

Figure 26:
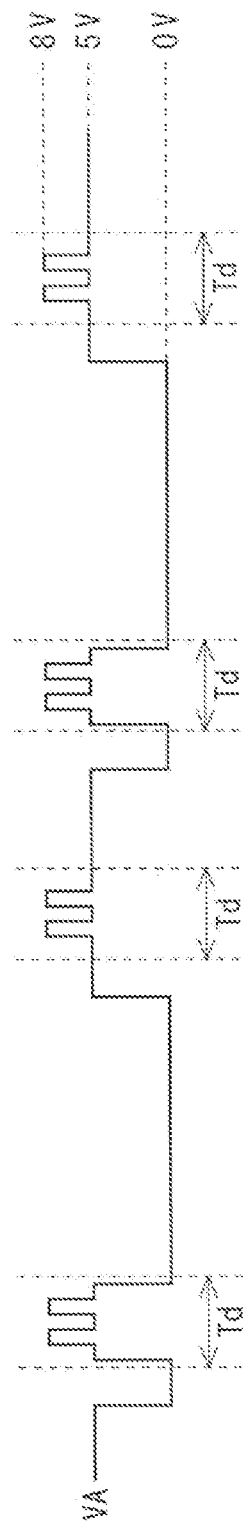
FIG. 26 is a waveform diagram of the black voltage when the black display is performed by one pixel of interest in a case where the second modification example is applied to the third embodiment.
Figure 27:
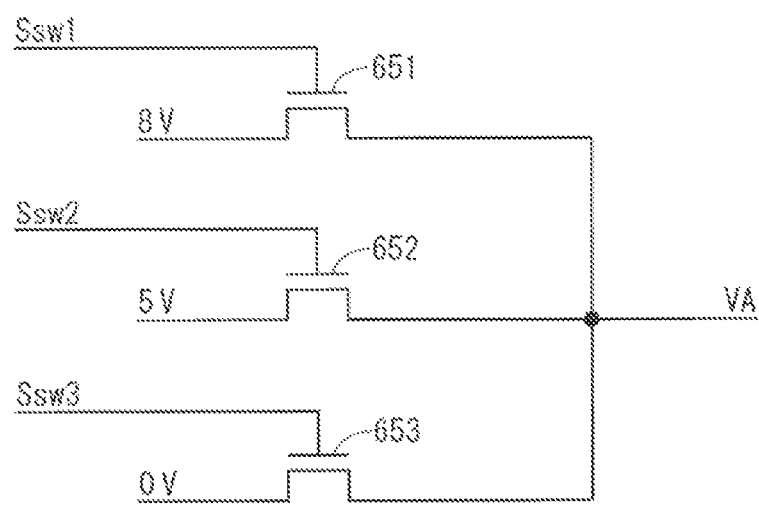
FIG. 27 is a circuit diagram illustrating a configuration example of the black voltage generation circuit in a case where the second modification example is applied to the third embodiment.

For example, in a case where the present modification (a waveform such as that illustrated in FIG. 21) is applied to the third embodiment, a waveform of the black voltage VA when the black display is performed by one pixel of interest is as illustrated in FIG. 26. At this time, it is sufficient that the black voltage generation circuit be configured to output three voltage values (8 V, 5 V, and 0 V). In other words, the black voltage generation circuit can adopt a configuration including three transistors 651 to 653 as illustrated in FIG. 27. By comparing FIG. 25 and FIG. 27, it is understood that the circuit size of the display voltage generation circuit 65 is reduced according to the third embodiment.

5. Other

In the above, although the description is made focusing on a normally-white type liquid crystal display device, the disclosure can also be applied to a normally-black type liquid crystal display device.

Although the disclosure has been described in detail above, the above description is exemplary in all respects and is not limiting. It is understood that numerous other modifications or variations can be made without departing from the scope of the disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device including a liquid crystal panel with a built-in touch panel, the liquid crystal display device comprising:
   a display voltage generation circuit configured to generate a first voltage and a second voltage;
   a plurality of pixel circuits each including a liquid crystal capacitance constituted by a pixel electrode and a common electrode, a memory circuit configured to store binary data, and a voltage selection circuit configured to supply either the first voltage or the second voltage to the pixel electrode in accordance with a value of the binary data stored in the memory circuit; and
   a common electrode drive circuit configured to change a voltage value of a voltage applied to the common electrode between a high-level voltage value and a low-level voltage value,
   wherein the touch panel uses the common electrode as an electrode for touch detection,
   the common electrode drive circuit applies a continuous pulse voltage for touch detection changing between the high-level voltage value and the low-level voltage value to the common electrode in a touch detection period for detecting a touched position on the touch panel, and
   the display voltage generation circuit changes a voltage value of each of the first voltage and the second voltage between the high-level voltage value and the low-level voltage value inversely with each other in periods other than the touch detection period and changes the voltage value of each of the first voltage and the second voltage in synchronization with the continuous pulse voltage in the touch detection period to maintain an absolute value of a voltage between the pixel electrode and the common electrode at a constant magnitude in each of the plurality of pixel circuits throughout a period from a point in time immediately before a start of the touch detection period to a point in time immediately after an end of the touch detection period.

2. The liquid crystal display device according to claim 1, wherein the display voltage generation circuit changes the voltage value of the first voltage inversely with the voltage value of the voltage applied to the common electrode and changes the voltage value of the second voltage similarly to the voltage value of the voltage applied to the common electrode both in the periods other than the touch detection period and in the touch detection period.

3. The liquid crystal display device according to claim 1, wherein the display voltage generation circuit
   changes the voltage value of the first voltage inversely with the voltage value of the voltage applied to the common electrode, in the periods other than the touch detection period,
   increases the voltage value of the first voltage by a difference value between the high-level voltage value and the low-level voltage value when a voltage value of the continuous pulse voltage increases and decreases the voltage value of the first voltage by the difference value between the high-level voltage value and the low-level voltage value when the voltage value of the continuous pulse voltage decreases, in the touch detection period, and
   changes the voltage value of the second voltage similarly to the voltage value of the voltage applied to the common electrode, both in the periods other than the touch detection period and in the touch detection period.

4. The liquid crystal display device according to claim 1, wherein the display voltage generation circuit
   changes the voltage value of the first voltage inversely with the voltage value of the voltage applied to the common electrode, in the periods other than the touch detection period,
   changes the voltage value of the first voltage inversely with the voltage value of the voltage applied to the common electrode when a voltage value of the continuous pulse voltage first changes and when the voltage value of the continuous pulse voltage last changes, in the touch detection period started in a period in which the voltage value of the voltage applied to the common electrode is maintained at the high-level voltage value,
   increases the voltage value of the first voltage by a difference value between the high-level voltage value and the low-level voltage value when the voltage value of the continuous pulse voltage increases and decreases the voltage value of the first voltage by the difference value between the high-level voltage value and the low-level voltage value when the voltage value of the continuous pulse voltage decreases, in a period from a point in time immediately after the voltage value of the continuous pulse voltage first changes to a point in time immediately before the voltage value of the continuous pulse voltage last changes, in the touch detection period started in the period in which the voltage value of the voltage applied to the common electrode is maintained at the high-level voltage value,
   increases the voltage value of the first voltage by the difference value between the high-level voltage value and the low-level voltage value when the voltage value of the continuous pulse voltage increases and decreases the voltage value of the first voltage by the difference value between the high-level voltage value and the low-level voltage value when the voltage value of the continuous pulse voltage decreases, in the touch detection period started in a period in which the voltage value of the voltage applied to the common electrode is maintained at the low-level voltage value, and
   changes the voltage value of the second voltage similarly to the voltage value of the voltage applied to the common electrode, both in the periods other than the touch detection period and in the touch detection period.

5. The liquid crystal display device according to claim 4, wherein each time one touch detection period is provided in a first drive period in which the voltage value of the voltage applied to the common electrode is supposed to be maintained at the high-level voltage value, one touch detection period is provided in a second drive period in which the voltage value of the voltage applied to the common electrode is supposed to be maintained at the low-level voltage value, and the following equation is established:

$$Ta - Tb = 2 \times Tz,$$

where Ta is a length of periods other than the touch detection period in the first drive period in which the touch detection period is provided, Tb is a length of periods other than the touch detection period in the second drive period in which the touch detection period is provided, and Tz is a length of a period from a point in time when the voltage value of the continuous pulse voltage first changes to a point in time when the voltage value of the continuous pulse voltage last changes in the touch detection period started in the first drive period.

6. The liquid crystal display device according to claim 1, the liquid crystal display device further comprising:
 a plurality of scanning signal lines configured to supply a scanning signal to each of the plurality of pixel circuits;
 a scanning signal line drive circuit configured to apply the scanning signal to each of the plurality of scanning signal lines;
 a plurality of data signal lines configured to supply a data signal to each of the plurality of pixel circuits;
 a data signal line drive circuit configured to apply the data signal to each of the plurality of data signal lines;
 a scanning signal supply control switch circuit provided in a region outside a display region where the plurality of pixel circuits are formed, the scanning signal supply control switch circuit being configured to control an electrical connection state between the scanning signal line drive circuit and the plurality of scanning signal lines in the display region; and
 a data signal supply control switch circuit provided in the region outside the display region, the data signal supply control switch circuit being configured to control an electrical connection state between the data signal line drive circuit and the plurality of data signal lines in the display region,
 wherein the scanning signal supply control switch circuit electrically disconnects the scanning signal line drive circuit and the plurality of scanning signal lines in the display region from each other before the start of the touch detection period and electrically connects the scanning signal line drive circuit and the plurality of scanning signal lines in the display region to each other after the end of the touch detection period, and
 the data signal supply control switch circuit electrically disconnects the data signal line drive circuit and the plurality of data signal lines in the display region from each other before the start of the touch detection period and electrically connects the data signal line drive circuit and the plurality of data signal lines in the display region to each other after the end of the touch detection period.

7. A method for driving a liquid crystal display device including a liquid crystal panel with a built-in touch panel, the liquid crystal display device including a display voltage generation circuit configured to generate a first voltage and a second voltage, a plurality of pixel circuits each including a liquid crystal capacitance constituted by a pixel electrode and a common electrode, a memory circuit configured to store binary data, and a voltage selection circuit configured to supply either the first voltage or the second voltage to the pixel electrode in accordance with a value of the binary data stored in the memory circuit, and a common electrode drive circuit configured to change a voltage value of a voltage applied to the common electrode between a high-level voltage value and a low-level voltage value, and the touch panel using the common electrode as an electrode for touch detection, the method comprising:
 a touch detection step of applying, by the common electrode drive circuit, a continuous pulse voltage for touch detection changing between the high-level voltage value and the low-level voltage value to the common electrode to detect a touched position on the touch panel,
 wherein the display voltage generation circuit changes a voltage value of each of the first voltage and the second voltage between the high-level voltage value and the low-level voltage value inversely with each other in periods other than a period in which the continuous pulse voltage is applied to the common electrode, and
 in the touch detection step, the display voltage generation circuit changes the voltage value of each of the first voltage and the second voltage in synchronization with the continuous pulse voltage to maintain an absolute value of a voltage between the pixel electrode and the common electrode at a constant magnitude in each of the plurality of pixel circuits throughout a period from a point in time immediately before a start of an application of the continuous pulse voltage to the common electrode to a point in time immediately after an end of the application of the continuous pulse voltage to the common electrode.

\* \* \* \* \*